(12) United States Patent
Ito et al.

(10) Patent No.: US 9,299,463 B2
(45) Date of Patent: Mar. 29, 2016

(54) METHOD OF DEPOSITING NOBLE METAL ON STRUCTURE MEMBER OF NUCLEAR PLANT

(71) Applicant: Hitachi-GE Nuclear Energy, Ltd., Hitachi-shi, Ibaraki (JP)

(72) Inventors: Tsuyoshi Ito, Hitachi (JP); Hideyuki Hosokawa, Hitachinaka (JP); Makoto Nagase, Mito (JP); Yoichi Wada, Hitachinaka (JP); Kazushige Ishida, Hitachi (JP); Motohiro Aizawa, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 535 days.

(21) Appl. No.: 13/679,287

(22) Filed: Nov. 16, 2012

(65) Prior Publication Data
US 2014/0037037 A1    Feb. 6, 2014

(30) Foreign Application Priority Data

Aug. 3, 2012 (JP) .................................. 2012-173226
Nov. 13, 2012 (JP) .................................. 2012-249031

(51) Int. Cl.
*G21C 19/32* (2006.01)
*G21C 17/022* (2006.01)
(Continued)

(52) U.S. Cl.
CPC ............. *G21C 19/32* (2013.01); *G21C 17/0225* (2013.01); *G21D 1/00* (2013.01); *G21F 9/06* (2013.01); *G21F 9/12* (2013.01); *G21F 9/30* (2013.01); *Y02E 30/40* (2013.01)

(58) Field of Classification Search
CPC ............. G21C 19/32; G21F 9/30; G21D 1/00
USPC ............. 376/277, 306, 308; 588/20; 148/243, 148/276; 106/1.21; 427/437, 230; 502/339; 422/19
See application file for complete search history.

(56) References Cited

U.S. PATENT DOCUMENTS

| 4,268,586 A | * | 5/1981 | Hanneman et al. | ........... 376/305 |
| 5,600,692 A | * | 2/1997 | Hettiarachchi | ............... 376/306 |

(Continued)

FOREIGN PATENT DOCUMENTS

| JP | 58-79196 A | 5/1983 |
| JP | 62-9296 A | 1/1987 |

(Continued)

OTHER PUBLICATIONS

Caine et al., "Low Temperature NobleChem (LTNC)", Proceedings of Water Chemistry, 2004, pp. 1054-1059 (six (6) sheets).

(Continued)

*Primary Examiner* — Jack W Keith
*Assistant Examiner* — Daniel Wasil
(74) *Attorney, Agent, or Firm* — Crowell & Moring LLP

(57) ABSTRACT

A noble metal injection apparatus is connected to a piping of a nuclear plant at the time of stop of the nuclear plant before start of the nuclear plant. In chemical decontamination, oxidation decontamination agent decomposition, and reduction decontamination on an inner surface of the pipe system are executed. After reduction decontamination, a part of an oxalic acid included in a reduction decontamination solution is decomposed and platinum is injected into the reduction decontamination solution of pH 3.5 or higher. When the platinum concentration becomes a preset concentration, a reduction agent is injected and the reduction decontamination solution including the platinum and reduction agent is brought into contact with the inner surface of the piping. The platinum is deposited on the inner surface of the piping. The injection of the platinum and reduction agent is stopped and the platinum and reduction agent are decomposed.

15 Claims, 16 Drawing Sheets

(51) Int. Cl.
*G21D 1/00* (2006.01)
*G21F 9/06* (2006.01)
*G21F 9/12* (2006.01)
*G21F 9/30* (2006.01)

(56) References Cited

U.S. PATENT DOCUMENTS

| | | | |
|---|---|---|---|
| 5,602,888 A * | 2/1997 | Hettiarachchi et al. | 376/306 |
| 5,608,766 A * | 3/1997 | Andresen et al. | 376/306 |
| 5,773,096 A * | 6/1998 | Hettiarachchi et al. | 376/306 |
| 5,818,893 A * | 10/1998 | Hettiarachchi | 376/306 |
| 6,335,475 B1 * | 1/2002 | Nagase et al. | 588/20 |
| 6,473,480 B1 * | 10/2002 | Kruger et al. | 376/306 |
| 6,793,883 B2 * | 9/2004 | Andresen et al. | 376/306 |
| 6,940,939 B1 * | 9/2005 | Ichikawa et al. | 376/305 |
| 7,811,392 B2 * | 10/2010 | Hosokawa et al. | 376/306 |
| 7,844,024 B2 * | 11/2010 | Hosokawa et al. | 376/306 |
| 2002/0080906 A1 * | 6/2002 | Andresen et al. | 376/306 |
| 2002/0150523 A1 | 10/2002 | Nagase et al. | |
| 2006/0067455 A1 | 3/2006 | Hosokawa et al. | |
| 2009/0086878 A1 | 4/2009 | Stellwag et al. | |
| 2009/0154636 A1 | 6/2009 | Tran et al. | |
| 2009/0290675 A1 | 11/2009 | Nagase et al. | |
| 2009/0316852 A1 | 12/2009 | Hosokawa et al. | |
| 2010/0136215 A1 | 6/2010 | Ito et al. | |

FOREIGN PATENT DOCUMENTS

| | | | |
|---|---|---|---|
| JP | 10-186085 A | 7/1998 | |
| JP | 2000-105295 A | 4/2000 | |
| JP | 2001-91688 A | 4/2001 | |
| JP | 2006-38483 A | 2/2006 | |
| JP | 2007-182604 A | 7/2007 | |
| JP | 2007-192745 A | 8/2007 | |
| JP | 2008-304381 A | 12/2008 | |
| JP | 2009-145348 A | 7/2009 | |
| JP | 2010-127788 A | 6/2010 | |
| JP | 2010-540928 A | 12/2010 | |

OTHER PUBLICATIONS

English Translation of Japanese Laid-open No. 58 (1983)-79196, pp. 1-13.
Japanese-language Office Action issued in counterpart Japanese Application No. 2012-249031 dated Feb. 2, 2016 with English-language translation (six (6) pages).

* cited by examiner

METHOD OF DEPOSITING NOBLE METAL ON STRUCTURE MEMBER OF NUCLEAR PLANT

CLAIM OF PRIORITY

The present application claims priority from Japanese Patent application serial no. 2012-173226, filed on Aug. 3, 2012 and Japanese Patent application serial no. 2012-249031, filed on Nov. 13, 2012, the content of which is hereby incorporated by reference into this application.

BACKGROUND OF THE INVENTION

1. Technical Field

The present invention relates to a method of depositing a noble metal on a structure member of a nuclear plant and more particularly to a method of depositing a noble metal on a structure member of a nuclear plant preferably applied to a boiling water nuclear plant.

2. Background Art

As a nuclear plant, for example, a boiling water nuclear power generation plant (hereinafter referred to as BWR plant) and a pressurized-water nuclear power generation plant (hereinafter referred to as PWR plant) are known. The BWR plant has a nuclear reactor having a core disclosed in a reactor pressure vessel (referred to as RPV). Cooling water supplied to the core by a recirculation pump (or an internal pump) is heated by the heat generated by nuclear fission of a nuclear fuel material in a fuel assembly loaded in the core and a part of the heated cooling water becomes steam. This steam is introduced to a turbine from the nuclear reactor and rotates the turbine. The steam discharged from the turbine is condensed by a condenser into water. This water is supplied to the RPV as feed water. The feed water suppresses generation of a radioactive corrosion product in the RPV, so that mainly metallic impurities are removed by a demineralizer installed in a feed water pipe.

In a nuclear plant such as a BWR plant and a PWR plant, the main structure members such as an RPV use stainless steel and nickel group alloy for a water contact portion in contact with water to suppress corrosion. A part of reactor water which is cooling water existing in the RPV is purified by the demineralizer of a reactor purification system and few metallic impurities existing in the reactor water are removed positively.

Even if the aforementioned corrosion measure is taken, it cannot be avoided that very few metallic impurities remain in the reactor water, so that a part of the metallic impurities, as a metallic oxide, is deposited on surface of fuel rods included in a fuel assembly. The deposited metallic impurities (for example, a metallic element) cause a nuclear reaction by irradiation of neutrons generated due to nuclear fission of a nuclear fuel material in the fuel rods and become a radioactive nuclide such as cobalt 60, cobalt 58, chromium 51, or manganese 54. These radioactive nuclides are mostly kept deposited on the fuel rod surface in an oxide shape, though a part of the radioactive nuclides elutes in the reactor water as ions according to the solubility of the taken-in oxide or are redischarged into the reactor water as an insoluble solid called clad. The radioactive material included in the reactor water is removed by the reactor water clean-up system.

However, the radioactive material that was not removed is stored on the surface of the structure member constituting the BWR plant in contact with the reactor water while it circulates in a recirculation system or the like along with the reactor water. As a result, the radiation radiated from the surface of the structure member causes a radiation exposure of an operator performing the periodic inspection of the BWR plant. Radiation exposure dose of the operator is controlled so as not to exceed the specified value for each person. Recently, the specified value has been decreased and the need is arising to decrease the radiation exposure dose of each person as much as economically possible.

So, a method of decreasing deposition of a radioactive nuclide on an inner surface of a pipe and a method of decreasing concentration of a radioactive nuclide in the reactor water are being discussed variously. For example, the following method has been proposed: Inject metallic ions such as zinc into the reactor water and on the inner surface of the recirculation pipe in contact with the reactor water to form a minute oxide film including zinc, thereby suppressing the take-in of a radioactive nuclide such as cobalt 60 or cobalt 58 into this oxide film (see Japanese Patent Laid-Open No. 58 (1983)-79196).

Japanese Patent Laid-Open No. 2006-38483 and Japanese Patent Laid-Open No. 2007-192745 describe a method comprising steps of bringing a processing solution including a formic acid aqueous solution including iron (II) ions, hydrogen peroxide, and hydrazine and the processing solution heated within the range from the normal temperature to 100° C. into contact with a surface of a structure member of a nuclear plant, forming a ferrite film on the surface, and suppressing deposition of a radioactive nuclide on the surface of the structure member after operation of the nuclear plant. Furthermore, a method has been proposed of forming a nickel ferrite film or a zinc ferrite film, which are more stable than a magnetite film, on a surface of a structure member of a nuclear plant, and furthermore suppressing deposition of a radioactive nuclide on the surface of the structure member after operation of the nuclear plant. It is described in Japanese Patent Laid-Open No. 2010-127788 that the forming quantity of the ferrite film formed on a surface of a structure member of a nuclear plant is measured by a quartz crystal microbalance apparatus.

Japanese Patent Laid-Open No. 2006-38483 describes that during operation stop of a nuclear plant, chemical decontamination of a surface of a structure member of a nuclear plant is executed, and a ferrite film is made to form on the surface, and platinum is made to deposit on the surface of the ferrite film.

To suppress stress corrosion cracking of a structure member of a nuclear plant, it is described in Japanese Patent Laid-Open No. 2001-91688 that a composite oxide layer of zinc and chromium in which zinc chromite ($ZnCr_2O_4$) and chromium oxide ($Cr_2O_3$) coexist is formed on a surface of a structure member in contact with the reactor water.

Chemical decontamination for removing an oxide film including a radioactive nuclide formed on a surface of a structure member of a nuclear plant that experienced an operation in contact with the reactor water, for example, on an inner surface of a pipe connected to a reactor pressure vessel is described in Japanese Patent Laid-Open No. 2000-105295. This chemical decontamination is executed to decrease the radiological dosage. Chemical decontamination mainly includes an oxidation decontamination process in which an oxidation decontamination solution is used, an oxidation decontamination agent decomposition process, a reduction decontamination process in which a reduction decontamination solution is used, a reduction decontamination agent decomposition process, and a purification process.

Nuclear plants apply technique of injecting hydrogen and platinum into the reactor water in the RPV to suppress the progress of stress corrosion cracking (see proceedings of water chemistry 2004, pages 1054-1059). In the platinum injection technique, concretely, a platinum complex is injected from the feed water pipe into the RPV after start of the nuclear plant and the platinum is deposited on the surface of the structure member (for example, the pipe of the nuclear plant) of the nuclear plant in contact with the reactor water. As a result, the surface is kept in a strong reduction environment and the progress of the stress corrosion cracking of the structure member is suppressed.

CITATION LIST

Patent Literature

[Patent literature 1] Japanese Patent Laid-Open No. 58 (1983)-79196
[Patent literature 2] Japanese Patent Laid-Open No. 2006-38483
[Patent literature 3] Japanese Patent Laid-Open No. 2007-182604
[Patent literature 4] Japanese Patent Laid-Open No. 2007-192745
[Patent literature 5] Japanese Patent Laid-Open No. 2010-127788
[Patent literature 6] Japanese Patent Laid-Open No. 2001-91688
[Patent literature 7] Japanese Patent Laid-Open No. 2000-105295

Non Patent Literature

[Non Patent literature 1] proceedings of water chemistry 2004, pages 1054-1059

SUMMARY OF THE INVENTION

Technical Problem

However, in the aforementioned platinum injection technique, the surface of the structure member is kept in the strong reduction environment by the platinum, so that the progress of the stress corrosion cracking of the structure member can be suppressed, though it is reported that an oxide film easily taking in $^{60}$Co is apt to be formed on the surface of the structure member. Therefore, the increase in the radiation exposure dose of an operator at the time of maintenance and inspection of the nuclear plant is feared.

In Japanese Patent Laid-Open No. 2006-38483, as described above, after the chemical decontamination of the surface of the structure member of the nuclear plant is executed during the operation stop of the nuclear plant, a ferrite film is formed on the surface and platinum is deposited on the surface of the ferrite film. In this case, the platinum is deposited on the surface of the structure member via the ferrite film during the operation stop of the nuclear plant, so that the surface of the structure member can be kept in the strong reduction environment from the start time of the nuclear plant and the formation of the oxide film easily taking in $^{60}$Co on the surface of the structure member can be suppressed. However, when bringing the solution including the platinum complex into contact with the surface of the ferrite film and depositing the platinum on the ferrite film surface, the inventors found that the platinum is hardly deposited on the surface of the ferrite film and the time required for the platinum deposited on the surface of the ferrite film to increase to a predetermined thickness is long.

Therefore, when depositing a noble metal (for example, platinum) on the surface of a structure member of a nuclear plant during the operation stop of the nuclear plant, the inventors considered a noble metal depositing method that allows shortening the time required for the execution of chemical decontamination on, and noble metal deposition on, the surface of the structure member.

An object of the present invention is to provide a method of depositing a noble metal on a structure member of a nuclear plant, which method allows shortening the time required for the execution of chemical decontamination on, and noble metal deposition on, a surface of the structure member of the nuclear plant.

Solution to Problem

A feature of the present invention for accomplishing the above object is a method comprising a step of executing reduction decontamination of a surface of a structure member of a nuclear plant in contact with reactor water by using an aqueous solution of a reduction decontamination agent; and a step of bringing the aqueous solution including noble metal ions and reduction agent generated by injecting chemical including the noble metal ions, and the reduction agent into the aqueous solution of the reduction decontamination agent into contact with the surface of the structure member on which the reduction decontamination is executed and depositing the noble metal on the surface, during at least one period among a first period that the reduction decontamination agent remains in the aqueous solution after a part of the reduction decontamination agent is decomposed in the decomposition process of the reduction decontamination agent to be executed after the reduction decontamination and a second period that purification of the aqueous solution of the reduction decontamination agent to be executed after the reduction decontamination agent decomposition process finishes is executed;

wherein the step of executing the reduction decontamination, the step of injecting the chemical including noble metal ions, and the reduction agent, and the step of depositing the noble metal are executed after operation stop of the nuclear plant but before start of the nuclear plant.

The present invention comprises a step of injecting the chemical including the noble metal ions, and the reduction agent into the aqueous solution during either of the first period that the reduction decontamination agent remains in the aqueous solution after a part of the reduction decontamination agent is decomposed in the decomposition process of the reduction decontamination agent executed after the reduction decontamination and the second period that the purification of the aqueous solution of the reduction decontamination agent to be executed after finish of the reduction decontamination agent decomposition process is executed, and a step of bringing the aqueous solution including the noble metal ions and the reduction agent into contact with the surface of the structure member in contact with the reactor water and depositing the noble metal on the surface of the structure member, so that the time required for the execution of the chemical decontamination on the surface of the structure member of the nuclear plant and the noble metal deposition on the surface can be shortened. The use of the reduction agent increases the noble metal deposition efficiency on the surface of the structure member, so that it contributes to further shortening of the execution time.

Advantageous Effect of the Invention

According to the present invention, the time required for the execution of chemical decontamination on, and noble metal deposition on, the surface of a structure member of a nuclear plant can be shortened.

DETAILED DESCRIPTION OF THE PREFERRED EMBODIMENTS

Figure 1:
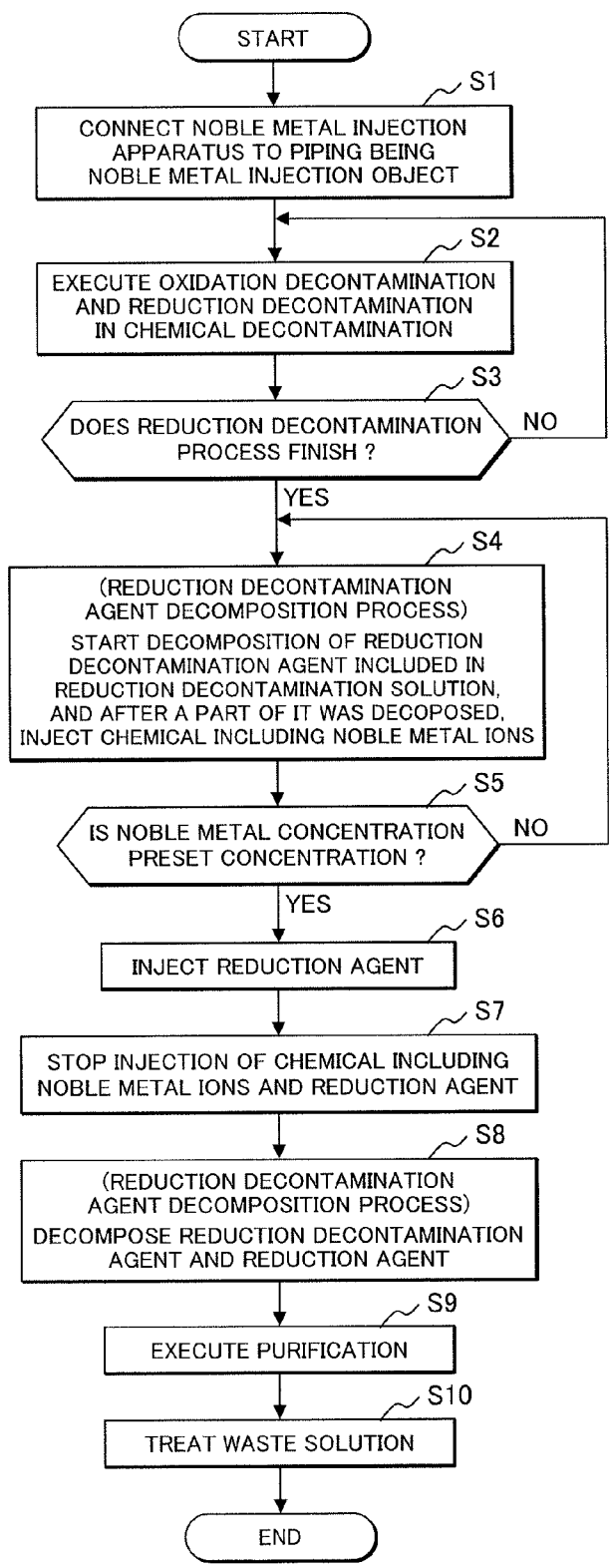
FIG. 1 is a flowchart showing a procedure of a method of depositing a noble metal on a structure member of a nuclear plant according to embodiment 1 which is a preferable embodiment of the present invention, applied to a recirculation pipe of a boiling water nuclear power generation plant.

The inventors examined in detail about formation of an oxide film easily taking in $^{60}$Co on a surface of a structure member of a nuclear plant. As a result, the inventors ascertained that after an oxide film is formed on the surface of the structure member of the nuclear plant in contact with reactor water during the operation of the nuclear plant, if platinum particles deposited on the surface of the oxide film by platinum injection into the reactor water in the reactor pressure vessel exist, the composition of the oxide film is changed by the platinum deposited onto the surface of the oxide film, thus the oxide film is changed to an oxide film easily taking in $^{60}$Co. Further, the inventors found that platinum is deposited on the surface of the metal of the structure member with no oxide film formed, thus the formation of an oxide film easily taking in $^{60}$Co is suppressed on the surface of the metal, and after all, the $^{60}$Co deposition quantity on the surface of the structure member of the nuclear plant in contact with the reactor water can be suppressed. Namely, in a state that no oxide film is formed on a surface of a base material the structure member of the nuclear plant, the surface of the structure member is exposed into the strong reduction environment, thus the deposition of an Fe oxide due to the oxidation of the structure member surface of Fe ions eluted from the base material of the structure member is suppressed and not only the deposition of $^{60}$Co taken in the oxide onto the structure member surface is suppressed but also the progress of the stress corrosion cracking of the structure member can be suppressed.

The conventional noble metal injection for depositing a noble metal such as platinum or palladium on the surface of the structure member of the nuclear plant in contact with the reactor water is executed during the operation of the nuclear plant after 3 months elapse from the start of the nuclear plant. The inventors, in this conventional noble metal injection, examined in detail the phenomenon that $^{60}$Co is taken in the oxide film that $^{60}$Co is formed on the surface of the structure member in contact with the reactor water. As a result, the inventors found that much $^{60}$Co is taken in the oxide film easily taking in $^{60}$Co, formed on the surface of the structure member during the 3 months from the start of the nuclear plant to the injection of the platinum into the reactor water in the reactor pressure vessel.

So, the inventors examined variously a method of not forming an oxide film easily taking in $^{60}$Co on the surface of the structure member during the 3 months from the start of the nuclear plant to the injection of the platinum into the reactor pressure vessel. As a result, the inventors found that during the chemical decontamination executed during the stop of the nuclear plant, that is, at the reduction decontamination agent decomposition process after end of the reduction decontamination process of the chemical decontamination, if platinum ions and the reduction agent are brought into contact with the surface of the structure member of the nuclear plant and platinum particles are deposited or a platinum film is formed on that surface, the formation of the oxide film easily taking in $^{60}$Co on the surface of the structure member can be suppressed. Namely, if platinum is deposited on the surface of the structure member of the nuclear plant before the start of the nuclear plant and then hydrogen is injected into the reactor water in the reactor pressure vessel after the start of the nuclear plant, the surface (for example, the inner surface of the pipe) of the structure member of the nuclear plant can be kept in the strong reduction environment from immediately after the start of the nuclear plant. By doing this, the redeposition of iron ions eluted from the base material surface of the structure member due to corrosion can be prevented.

Figure 4:
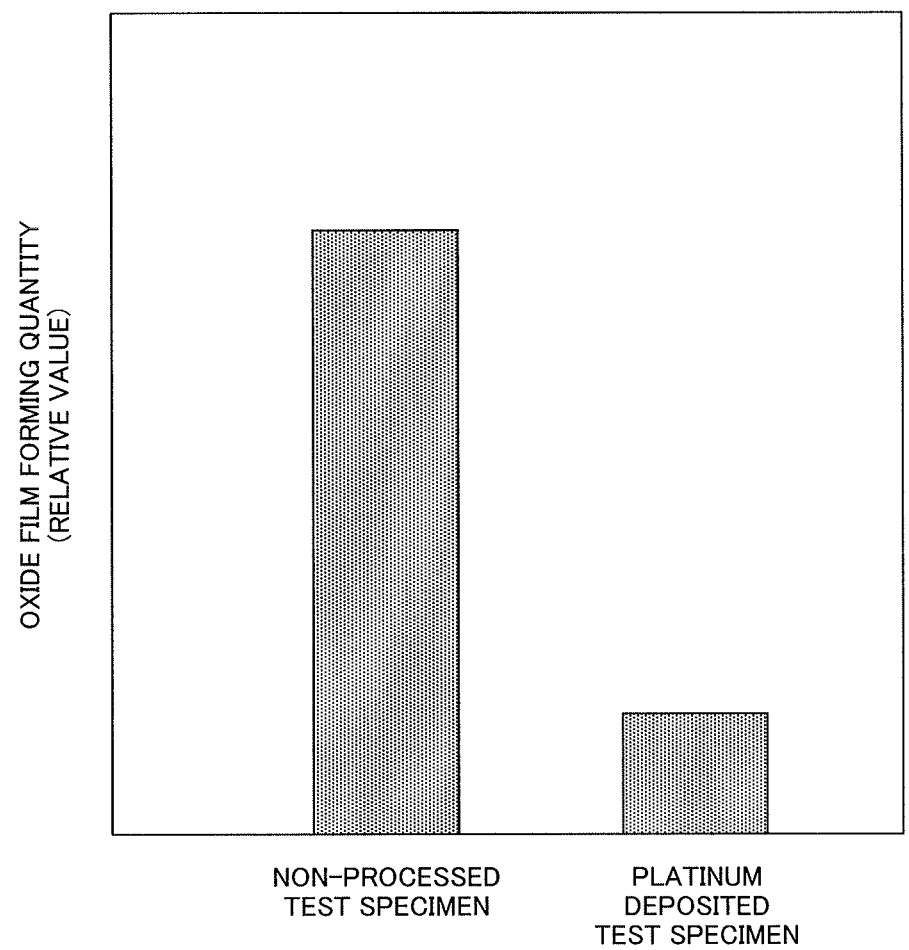
FIG. 4 is an explanatory drawing showing an oxide film forming quantity on each of an unprocessed test specimen and a platinum-deposited test specimen.
Figure 5:
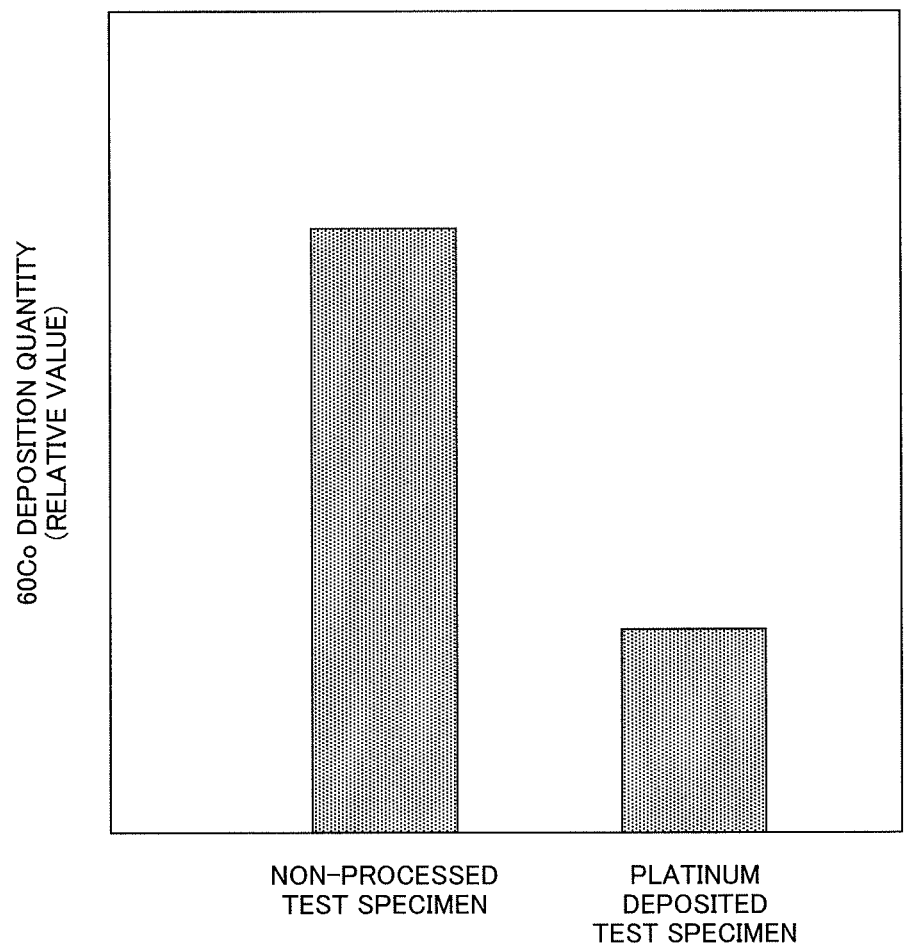
FIG. 5 is an explanatory drawing showing a deposition state of radioactive nuclide ($^{60}$Co) on each of an unprocessed test specimen and a platinum-deposited test specimen.

Quantity of each oxide film formed on the surface of each of a test specimen (platinum-deposited test specimen) made of stainless steel that platinum which is a noble metal is deposited on the surface and a test specimen (unprocessed test specimen) made of stainless steel that no noble metal is deposited on the surface is shown in FIG. 4. The experimental results shown in FIG. 4 are obtained by using imitated reactor water imitating the reactor water in the reactor pressure vessel of the boiling water nuclear plant, immersing each test specimen in the imitated reactor water, and forming an oxide film on the surface of each test specimen. The imitated reactor water is water at 280° C. including dissolved oxygen of about 200 ppb, dissolved hydrogen of about 50 ppb, and hydrogen peroxide. The oxide film forming quantity of the platinum-deposited test specimen is decreased to ⅕ of the oxide film forming quantity of the unprocessed test specimen. The deposited quantity of $^{60}$Co on the surface of each of the platinum-deposited test specimen and the unprocessed test specimen is shown in FIG. 5. $^{60}$Co is added as a tracer to the imitated reactor water used in the experimentation to obtain the results shown in FIG. 4, and each test specimen is immersed in the imitated reactor water including $^{60}$Co, and the experiment for confirming the deposited quantity of $^{60}$Co is executed, and the experimental results shown in FIG. 5 are obtained. The deposited quantity of $^{60}$Co of the platinum-deposited test specimen is decreased to about ⅓ of the deposited quantity of $^{60}$Co of the unprocessed test specimen. As a result, it is found that the stainless steel with platinum deposited suppresses the deposition of a radioactive nuclide more than the stainless steel with no platinum deposited does.

So, the inventors examined the technique capable of depositing platinum on the surface of the structure member of the nuclear plant while the chemical decontamination is executed during the stop of the nuclear plant before the start of the nuclear plant. As a part of the examination, the inventors reviewed the conventional noble metal injection of injecting platinum into the reactor water in the reactor pressure vessel and depositing platinum particles on the surface of the structure member of the nuclear plant and found that platinum ions are reduced on the surface of the structure member of the nuclear plant and are deposited as platinum on the surface of the structure member. The inventors examined furthermore variously a method capable of reducing platinum ions even at a low temperature such as 100° C. or lower. As a result of the examination, it was found that processing solution including chemical including platinum ions, and reduction agent are brought into contact with the surface of the structure member of the nuclear plant, thus the deposition of platinum particles on the surface (or the formation of a platinum film) can be achieved. In addition, the inventors ascertained that platinum ions are reduced efficiently using the reduction agent, thus platinum is efficiently deposited on the surface of the structure member of the nuclear plant compared with the conventional noble metal injection executed during the operation of the nuclear plant and furthermore, the platinum is formed into a minute film shape on that surface. Further, platinum is efficiently deposited on the surface of the structure member of the nuclear plant by the use of the reduction agent compared with the noble metal deposition process described in Japanese Patent Laid-Open No. 2006-38483 and is formed into a minute film shape, and at the same time, the time required for the platinum deposition can be shortened.

In consideration of the knowledge obtained by the aforementioned examination, the inventors examined a method of depositing platinum on the surface of the structure member of the nuclear plant while the chemical decontamination is executed for the structure member of the nuclear plant during the stop of the nuclear plant before the start of the nuclear plant.

The inventors thought that bringing the processing solution including a first chemical including platinum ions and a second chemical including the reduction agent into contact with the surface of the structure member of the nuclear plant will produce the reaction indicated by Formula (1), thereby making it possible to deposit platinum particles on that surface or form a platinum film on that surface.

$$Pt^{2+}+2e^{2-} \rightarrow Pt \qquad (1)$$

Then, the inventors tried by the experimentation to bring the processing solution including the first chemical including platinum ions and the second chemical including the reduction agent into contact with the surfaces of test specimens made of stainless steel imitating the structure member made of stainless steel of the nuclear plant so that platinum particles will be deposited on the surface of the one test specimen and a platinum film will be formed on the surfaces of the other test specimens.

Figure 6:
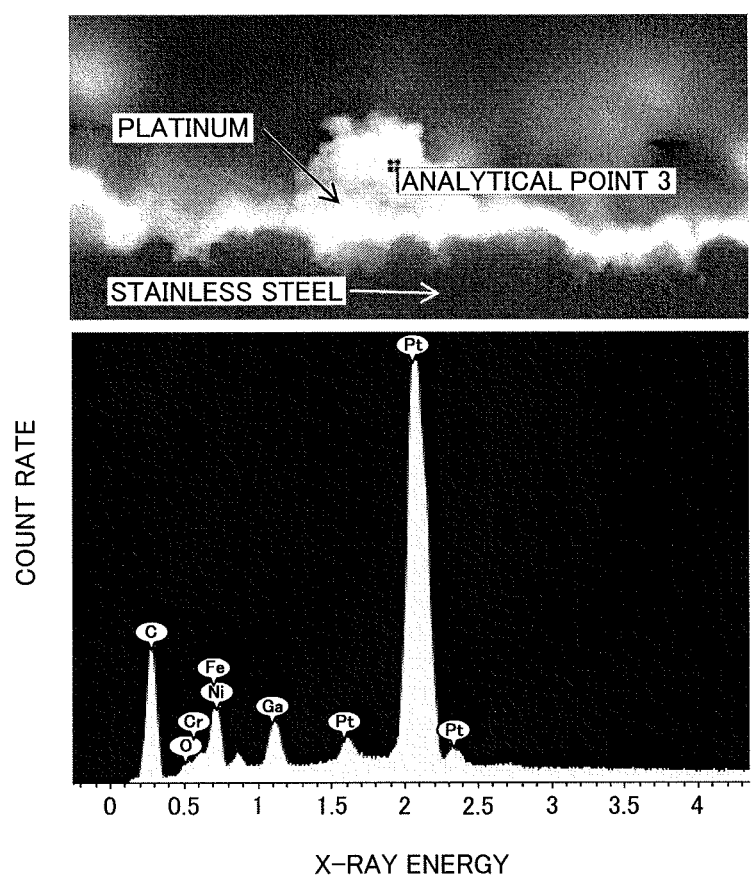
FIG. 6 is an explanatory drawing showing a vertical sectional image of a platinum film in a state that the platinum film is formed on a surface of a structure member made of stainless steel and composition analytical results.

The inventors brought the processing solution generated by adding the first chemical including platinum ions and the second chemical including the reduction agent (for example, hydrazine) to pure water into contact with the surface of the aforementioned test specimen made of stainless steel and formed a platinum film on the surface. After the formation of the platinum film, the inventors executed the observation of the platinum film formed on the surface of the test specimen by an electron microscope and the composition analysis of the platinum film. The results of the observation by the electron microscope and the composition analysis are shown in FIG. 6. The composition analysis indicates the composition analytical results at the analytical point 3 shown in FIG. 6 and as a result of the analysis, it was confirmed that the composition at the analytical point 3 is platinum. The platinum ion concentration is changed, thus it was confirmed that the platinum particles are uniformly decentralized and are deposited on the surface of the test specimen in a minute film state based on the results of the observation by the electron microscope and the composition analysis which are shown in FIG. 6. As mentioned above, when the processing solution including platinum ions and the reduction agent is used, the minute platinum film can be formed on the surface of the test specimen. Further, even when platinum particles were deposited on the surface of the aforementioned test specimen made of stainless steel, the similar results were obtained.

Figure 7:
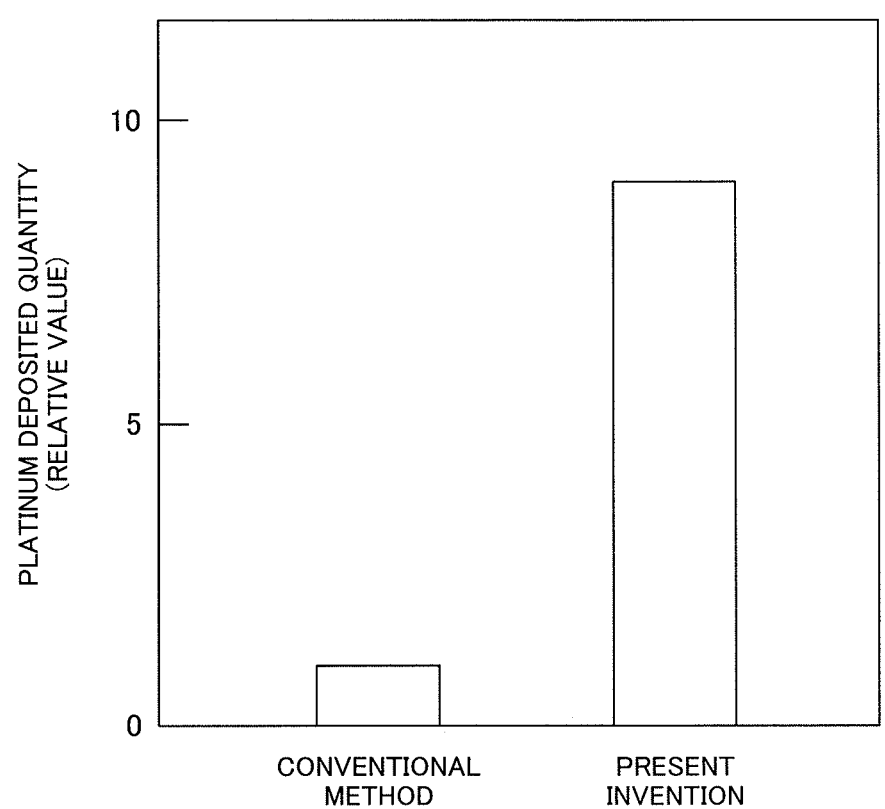
FIG. 7 is an explanatory drawing showing deposited quantity of platinum of each of unprocessed test specimen and platinum-deposited test specimen.

The deposited quantity of platinum (by the conventional method) on the surface of the test specimen made of stainless steel when the platinum injection is executed and the deposited quantity of platinum (the present invention) on the surface of the test specimen when the processing solution generated by adding the first chemical including platinum ions and the second chemical including the reduction agent to pure water is brought into contact with the surface of the test specimen made of stainless steel are shown in FIG. 7. The deposited quantity of platinum (the present invention) when the processing solution of the latter including the first chemical and the second chemical is used becomes about 9 times of the deposited quantity of platinum by the conventional method. In addition, the inventors confirmed that when the platinum concentration of the processing solution is decreased, platinum particles are deposited on the surface of the test specimen made of stainless steel.

Furthermore, the inventors executed experiment for confirming whether platinum particles can be deposited on the surface of the test specimen made of stainless steel imitating the structure member of the nuclear plant or not during the chemical decontamination, that is, at the reduction decontamination agent decomposition process after end of the reduction decontamination process of the chemical decontamination. In this experiment, an aqueous solution (an imitated reduction decontamination solution) imitating the reduction decontamination solution under decomposition of the reduction decontamination agent at the reduction decontamination agent decomposition process after end of the reduction decontamination process is used. The imitated reduction decontamination solution is an oxalic acid aqueous solution of pH 4 that the oxalic acid concentration of the reduction decontamination agent is 50 ppm. Hydrazine is easily decomposed compared with the oxalic acid, so that when the oxalic acid concentration is decreased down to 50 ppm, the reduction decontamination solution does not include hydrazine. Further, the reduction decontamination solution used at the reduction decontamination process is an aqueous solution of pH 2.5 having an oxalic acid concentration of 2000 ppm and a hydrazine concentration of 600 ppm. The above imitated reduction decontamination solution imitates the reduction decontamination solution when the oxalic acid of the reduction decontamination solution having an oxalic acid concentration of 2000 ppm at the point of time when the reduction decontamination process ends is decomposed by the reduction decontamination agent decomposition process of the subsequent chemical decontamination and the oxalic acid becomes 50 ppm.

The processing solution generated by adding the first chemical including platinum ions and the second chemical including the reduction agent, for example, hydrazine to pure water is mixed with the oxalic acid aqueous solution with an oxalic acid concentration of 50 ppm which is an imitated reduction decontamination solution and the test specimen made of stainless steel is immersed in the mixed solution. The platinum concentration in the processing solution generated by adding the first chemical including platinum ions, and hydrazine to pure water is 100 ppt and the temperature of the mixed solution in which the test specimen made of stainless steel is immersed is 90° C. Concretely, the mixed solution including the oxalic acid is generated by adding platinum into the aqueous solution including an oxalic acid of 50 ppm so as to obtain 100 ppt and then further adding hydrazine so as to become 300 ppm. After 20 minutes elapse from immersion of the test specimen in the mixed solution, the test specimen is taken out from the mixed solution. And, the platinum deposition state on the test specimen surface is observed and the deposited quantity of platinum on the test specimen surface is obtained. The deposited quantity of platinum on the test specimen surface is the deposited quantity of platinum shown in "Present invention" in FIG. 8. Further, "Pure water" shown in FIG. 8 indicates the platinum quantity deposited on the test specimen surface by immersing the test specimen made of stainless steel in the processing solution generated by adding a Pt solution into pure water of 1 liter so that the platinum concentration becomes 100 ppt and then further adding hydrazine so as to obtain 300 ppm.

Figure 8:
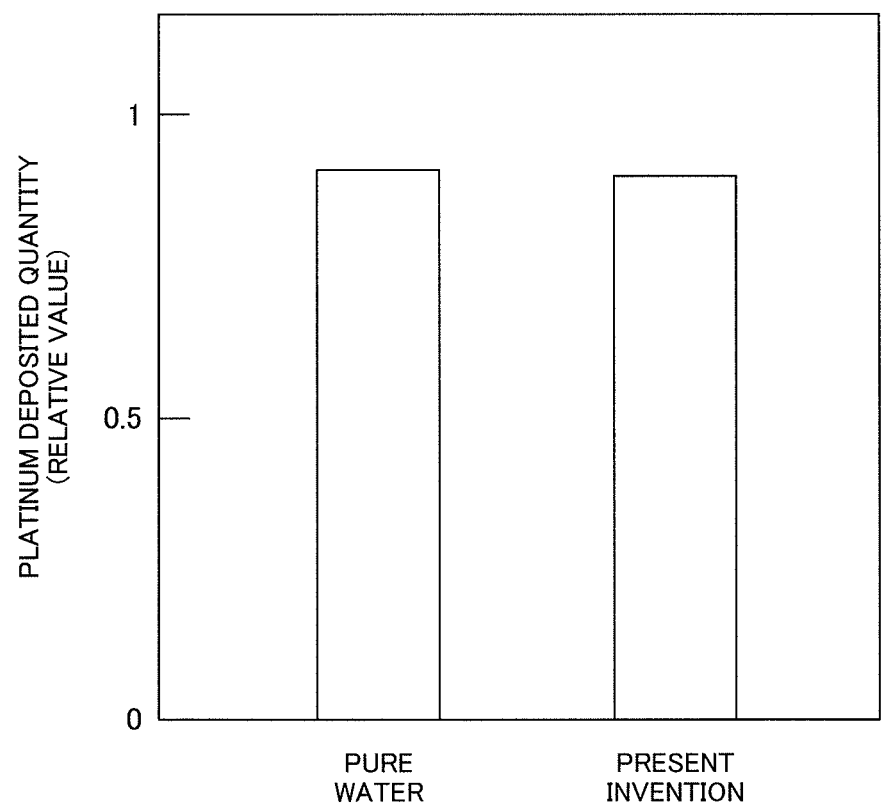
FIG. 8 is an explanatory drawing showing deposited quantity of platinum in pure water and during decomposition process of reduction decontamination agent of the present invention.

As a result, platinum particles are decentralized uniformly and are deposited in a minute film shape on the surface of the test specimen taken out from the mixed solution, as shown in FIG. 6, similarly to the case that the aforementioned processing solution generated by adding the first chemical including platinum ions, and hydrazine into pure water is brought into contact with the surface of the test specimen made of stainless steel. As described above, the deposited quantity of platinum on the surface of the test specimen immersed in the mixed solution of the imitated reduction decontamination solution and the processing solution (the present invention), as shown in FIG. 8, is almost equal to the deposited quantity of platinum on the surface of the test specimen made of stainless steel immersed in the processing solution generated by adding the first chemical including platinum ions, and hydrazine into pure water.

Based on the above discussion results, the inventors newly found that the chemical including platinum ions, and hydrazine are injected into the reduction decontamination solution of pH 4 including the reduction decontamination agent, for example, an oxalic acid after the start of the decomposition of the reduction decontamination agent at the reduction decontamination agent decomposition process after end of the reduction decontamination process of the chemical decontamination, thus even in a state that a part of the reduction decontamination agent remains, platinum particles can be deposited on the surface of the structure member of the nuclear plant that the reduction decontamination was executed. Furthermore, the inventors found that the reduction decontamination agent and the reduction agent are decomposed by the catalyst action of the platinum generated from the platinum ions injected by the reduction agent action, so that the time required for the decomposition of the reduction decontamination agent can be shortened.

Further, even if the aqueous solution including platinum ions and hydrazine which is generated by injecting the chemical including platinum ions, and hydrazine which is a reduction agent into the aqueous solution in which the reduction decontamination agent and reduction agent are decomposed is brought into contact with the structure member of the nuclear plant at the purification process which is a process of the chemical decontamination, platinum can be deposited on the surface of the structure member. Since the concentration of the reduction decontamination agent in the aqueous solution is very small, the deposited quantity of platinum on the surface of the structure member is increased and the time required for the platinum deposition is shortened.

The present invention has been created based on of the new knowledge described above.

Any of the palladium described above, rhodium, ruthenium, osmium, and iridium may be used except platinum as a noble metal deposited on the surface of the structure member of the nuclear plant by the noble metal injection. Further, as a reduction agent, either of ammonia and urea may be used except hydrazine.

The inventors examined conditions for depositing noble metal particles, for example, platinum particles on the surface of the structure member of the nuclear plant in contact with the reactor water after the start of the reduction decontamination agent decomposition in the reduction decontamination agent decomposition process. After the start of the reduction decontamination agent decomposition, the pH of the aqueous solution needs to be increased to 3.5 or more in order to add the chemical including noble metal ions (for example, platinum ions) and the reduction agent to the reduction decontamination solution (the reduction decontamination agent aqueous solution) including the reduction decontamination agent (for example, oxalic acid), bring the aqueous solution including noble metal ions, the reduction agent, and the reduction decontamination agent into contact with the surface of the structure member of the nuclear plant in contact with the reactor water, and deposit noble metal particles on the surface. The upper limit of the pH of the aqueous solution is 9.0. As a result, the pH of the aqueous solution including noble metal ions, the reduction agent, and the reduction decontamination agent to be brought into contact with the surface is preferably set within the range from 3.5 to 9.0 to deposit noble metal particles (for example, platinum particles) on the surface of the structure member of the nuclear plant. When the pH of the aqueous solution is less than 3.5, the surface of the structure member is dissolved by the action of the reduction decontamination agent included in the reduction decontamination solution, so that the noble metal particles are not deposited on the surface of the structure member.

The temperature of the aqueous solution including the chemical including platinum ions, reduction agent, and reduction decontamination agent is desirably adjusted within the range from 60° C. to 100° C. When the temperature of the aqueous solution becomes lower than 60° C., a noble metal is hardly deposited on the surface of the structure member of the nuclear plant and a long period of time is required for the deposition of a noble metal of a predetermined quantity. Therefore, the temperature of the aqueous solution including the chemical including platinum ions, reduction agent, and reduction decontamination agent is increased to 60° C. or higher, thus a noble metal can be deposited on the surface of the structure member of the nuclear plant in a short period of time, which prevents other processes of the periodic inspection of the nuclear plant from being adversely affected. Further, when the temperature of the aqueous solution becomes higher than 100° C., the aqueous solution needs to be pressurized to suppress the boiling of the aqueous solution. Therefore, the noble metal injection apparatus which is a temporary facility is required for pressure resistance and the injector is made larger. Therefore, it is not preferable to increase the temperature of the aqueous solution than 100° C.

Further, the noble metal concentration of the aqueous solution including the chemical including noble metal ions, the reduction agent, and the reduction decontamination agent which is brought into contact with the surface of the structure member of the nuclear plant is within the range from 10 ppt to 1 ppm. When the noble metal concentration is lower than 10 ppt, the noble metal quantity deposited on the surface of the structure member of the nuclear plant becomes very little and it does not contribute to a decrease in the dissolved oxygen concentration of the reactor water during the operation of the nuclear plant. Further, when the noble metal concentration becomes 1 ppm, a noble metal film is formed on the surface of the structure member of the nuclear plant, and when the noble metal concentration becomes higher than 1 ppm, the thickness of the noble metal film is merely increased and an expensive noble metal is deposited uselessly on the surface. Therefore, it is desirable that the aforementioned noble metal concentration of the aqueous solution be decreased to 1 ppm or less.

It is desirable that the reduction agent concentration of the aqueous solution including noble metal ions (for example, platinum ions), the reduction agent (for example, hydrazine), and the reduction decontamination agent be increased to 10 ppt or higher. If the reduction agent concentration in the aqueous solution is excessively smaller than the noble metal ion concentration, no reduction reaction is produced, and the noble metal deposition quantity on the surface of the structure member is decreased. When the reduction agent exists excessively for the noble metal ions in the aqueous solution, regarding the noble metal deposition quantity on the structure member surface, no problem arises. However, when the reduction agent exists in large quantities in the aqueous solution, the decomposition of the reduction agent takes time. Further, the reduction agent concentration of the aqueous solution including noble metal ions, the reduction agent, and the reduction decontamination agent is preferably made higher than the noble metal concentration of this aqueous solution.

The embodiments of the present invention reflecting the examination results described above will be explained below.

Embodiment 1

A method of depositing a noble metal on a structure member of a nuclear plant according to embodiment 1 which is a preferable embodiment of the present invention will be explained by referring to FIGS. 1, 2, and 3. The method of depositing the noble metal on the structure member of the nuclear plant of the present embodiment is applied to a recirculation pipe of a boiling water nuclear plant (a BWR plant). In the present embodiment, injection of platinum which is a noble metal is executed during operation stop before the start of the BWR plant.

Figure 2:
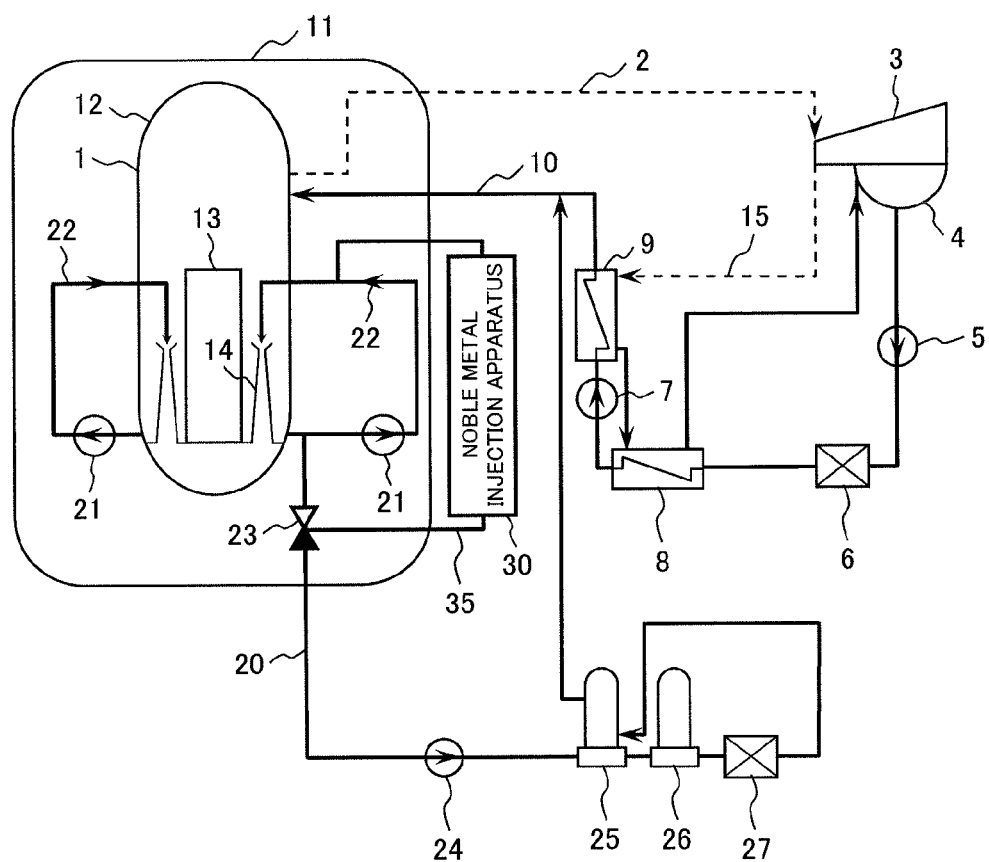
FIG. 2 is an explanatory drawing showing a state that a noble metal injection apparatus used when executing a method of depositing a noble metal on a structure member of a nuclear plant shown in FIG. 1 is connected to a recirculation pipe of a boiling water nuclear power generation plant.
Figure 3:
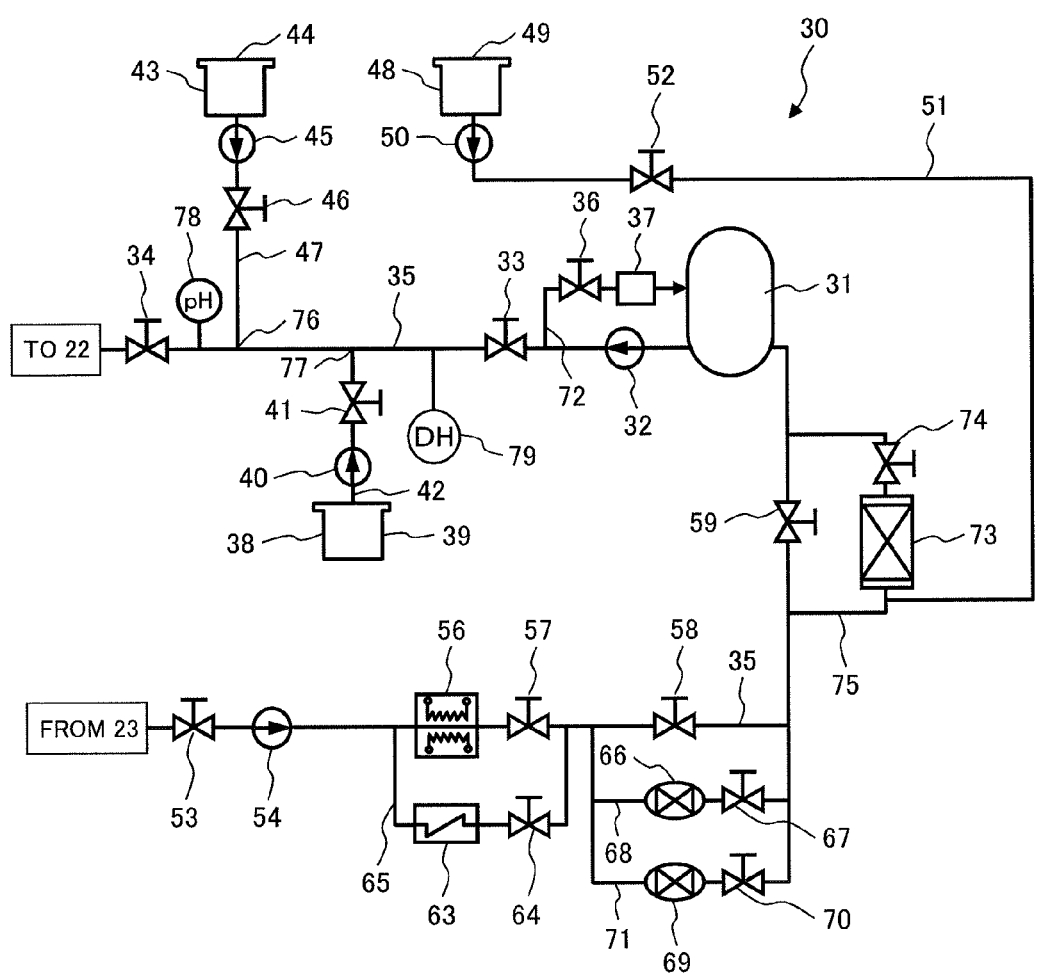
FIG. 3 shows a detailed structural diagram showing a noble metal injection apparatus shown in FIG. 2.

The BWR plant which is a nuclear power generation plant is provided with a nuclear reactor 1, a turbine 3, a condenser 4, a recirculation system, a reactor purification system, and a feed water system, as shown in FIG. 2. The nuclear reactor 1 has a reactor pressure vessel (hereinafter referred to as RPV) 12 in which a core 13 is disposed and jet pumps 14 are installed in the RPV 12. Many fuel assemblies (not shown) are loaded in the core 13. The fuel assembly includes a plurality of fuel rods filled with a plurality of fuel pellets produced by a nuclear fuel material. The recirculation system has a recirculation pipe 22 made of stainless steel and a recirculation pump 21 installed on the recirculation pipe 22. The feed water system is structured so as to install a condensate pump 5, a condensate purification apparatus (for example, a condensate demineralizer) 6, a low-pressure feed water heater 8, a feed water pump 7, and a high-pressure feed water heater 9 on a feed water pipe 10 connected to the condenser 4 and the RPV 12 in this order from the condenser 4 toward the RPV 12. The reactor purification system installs a purification system pump 24, a regeneration heat exchanger 25, a non-regeneration heat exchanger 26, and a reactor water purification apparatus 27 on a purification system pipe 20 connected to the recirculation pipe 22 and the feed water pipe 10 in this order. The purification system pipe 20 is connected to the recirculation pipe 22 on the upstream side of the recirculation pump 21. The nuclear reactor 1 is installed in a reactor containment vessel 11 disposed in a reactor building (not shown).

Cooling water in the RPV 12 is pressurized by the recirculation pump 21 and is jetted into the jet pump 14. The cooling water existing around a nozzle of the jet pump 14 is sucked into the jet pump 14 and is supplied to the core 13. The cooling water supplied to the core is heated by the heat generated by nuclear fission of a nuclear fuel material in the fuel rods and a part of the heated cooling water becomes steam. The steam is removed moisture by a steam separator (not shown) and a steam drier (not shown) which are installed in the RPV 12, and then is introduced to the turbine 3 from the RPV 12 through a main steam pipe 2 and rotates the turbine 3. A generator (not shown) connected to the turbine 3 rotates and power is generated.

The steam discharged from the turbine 3 is condensed by the condenser 4 and becomes water. This water, as feed water, is supplied into the RPV 12 through the feed water pipe 10. The feed water flowing through the feed water pipe 10 is pressurized by the condensate pump 5, is removed impurities by the condensate purification apparatus 6, and is pressurized more by the feed water pump 7. The feed water is heated by the low-pressure feed water heater 8 and the high-pressure feed water heater 9 and is introduced into the RPV 12. The extraction steam extracted from the turbine 3 by a extraction 15 is supplied respectively to the low-pressure feed water heater 8 and the high-pressure feed water heater 9 to heat the feed water.

A part of the cooling water flowing in the recirculation pipe 22 flows into the purification system pipe 20 of the reactor purification system by the drive of the purification system pump 24, is cooled by the regeneration heat exchanger 25 and the non-regeneration heat exchanger 26, and then is purified by the reactor water purification apparatus 27. The purified cooling water is heated by the regeneration heat exchanger 25 and is returned to the RPV 12 through the purification system pipe 20 and the feed water pipe 10.

Both ends of the circulation pipe (processing solution pipe) 35 of the noble metal injection apparatus 30 which is a temporary facility are connected to the recirculation pipe 22 made of stainless steel during the operation stop period of the BWR plant after the operation stop of the BWR plant. The operation of connecting the circulation pipe 35 to the recirculation pipe 22 will be explained concretely. When the operation of the BWR plant is stopped, for example, the bonnet of a valve 23 installed on the purification system pipe 20 connected to the recirculation pipe 22 is opened and the portion thereof on the side of the purification system pump 24 is blocked. One end of the circulation pipe 35 is connected to a flange of the valve 23. By doing this, one end of the circulation pipe 35 is connected to the recirculation pipe 22 on an upstream side of the recirculation system pump 21. On the other hand, a branch pipe such as a drain pipe connected to the recirculation pipe 22 on a downstream side of the recirculation system pump 21 or the instrumentation pipe is separated and the other end of the circulation pipe 35 is connected to the separated branch pipe. Both ends of the circulation pipe 35 are connected to the recirculation pipe 22 and a closed loop including the recirculation pipe 22 and the circulation pipe 35 is formed. Each opening in the RPV 12 at both ends of the recirculation pipe 22 is blocked by a plug (not shown) so as to prevent the oxidation decontamination solution, the reduction decontamination solution, and the aqueous solution including platinum ions, hydrazine, and oxalic acid, which will be described later, from flowing into the RPV 12. After the deposition of platinum on an inner surface of the recirculation pipe 22 was finished and all the processes of the chemical decontamination of the recirculation pipe were finished, the noble metal injection apparatus 30 is removed from the recirculation pipe 22 during the operation stop period of the BWR plant. Thereafter, the operation of the BWR plant is started.

The noble metal injection apparatus 30 is used for both processes of the chemical decontamination of the inner surface of the recirculation pipe 22 and the noble metal deposition on the inner surface of the recirculation pipe 22. The noble metal injection apparatus 30 connected to the recirculation pipe 22 is disposed in the reactor containment vessel 11, which is a radiation controlled area in the BWR plant.

In the present embodiment, the recirculation pipe 22 is selected as a noble metal deposition object, though when using each pipe of the feed water system, coolant purification system, and auxiliary cooling system as a noble metal deposition object, the circulation pipe 35 is connected to a piping of the concerned noble metal deposition object.

A detailed structure of the noble metal injection apparatus 30 will be explained by referring to FIG. 3. The noble metal injection apparatus 30 is provided with a surge tank 31, circulation pumps 32 and 54, the circulation pipe 35, an ejector 37, a platinum ion injection apparatus 38, a reduction agent injection apparatus 43, an oxidizing agent supply apparatus 48, a heater 56, a cation exchange resin tower 66, and a decomposition apparatus 73.

An open/close valve 53, a circulation pump 54, the heater 56, valves 57, 58, and 59, the surge tank 31, the circulation pump 32, a valve 33, and an open/close valve 34 are installed on the circulation pipe 35 in this order from the upstream side. A pipe 65 bypassing the heater 56 and the valve 57 is connected to the circulation pipe 35 and a cooler 63 and a valve 64 are installed on the pipe 65. The cation exchange resin tower 66 and a valve 67 are installed on a pipe 68 bypassing the valve 58 whose both ends are connected to the circulation pipe 35. The mixed bed resin tower 69 and a valve 70 are installed on a pipe 71 having both ends connected to the pipe 68 for bypassing the cation exchange resin tower 66 and the valve 67. The cation exchange resin tower 66 is filled with cation exchange resin and the mixed bed resin tower 69 is filled with cation exchange resin and anion exchange resin.

A pipe 75 whereon a valve 74 and the decomposition apparatus 73 are installed bypasses a valve 59 and is connected to the circulation pipe 35. The decomposition apparatus 73 is internally filled with, for example, an active carbon catalyst with ruthenium spread on the active carbon surface. The surge tank 31 is installed on the circulation pipe 35 between the valve 59 and the circulation pump 32. A pipe 72 whereon a valve 36 and the ejector 37 are installed is connected to the circulation pipe 35 between the valve 33 and the circulation pump 32 and furthermore, is connected to the surge tank 31. A hopper (not shown) for supplying potassium permanganate (oxidation decontamination agent) used to oxidize and dissolve contaminants on the inner surface of the recirculation pipe 22 and furthermore, oxalic acid (reduction decontamination agent) used to reduce and dissolve contaminants on the inner surface of the recirculation pipe 22 into the surge tank 31 is installed on the ejector 37.

The platinum ion injection apparatus 38 includes a bath tank 39, an injection pump 40, and an injection pipe 42. The bath tank 39 is connected to the circulation pipe 35 by the injection pipe 42 including the injection pump 40 and a valve 41. The bath tank 39 is filled with a chemical (a first chemical) including platinum ions obtained by dissolving and preparing a platinum complex in water. As a platinum complex, for example, hexahydroxy platinum acid sodium hydrate ($Na_2(Pt(OH)_6) \cdot nH_2O$) is used.

The reduction agent injection apparatus 43 includes a bath tank 44, an injection pump 45, and an injection pipe 47. The bath tank 44 is connected to the circulation pipe 35 by the injection pipe 47 including the injection pump 45 and a valve 46. The bath tank 44 is filled with hydrazine which is a reduction agent.

The oxidizing agent supply apparatus 48 includes a bath tank 49, a supply pump 50, and a supply pipe 51. The bath tank 49 is connected to the pipe 75 by the supply pipe 51 including the supply pump 50 and a valve 52 on the upstream side of the decomposition apparatus 73. The bath tank 49 is filled with hydrogen peroxide which is an oxidizing agent. As an oxidizing agent, ozone or water with oxygen dissolved may be used.

In the present embodiment, a first connection point (a connection point of the injection pipe 42 to the circulation pipe 35) 77 of the platinum ion injection apparatus 38 to the circulation pipe 35 is positioned on the upstream side of a second connection point (a connection point of the injection pipe 47 to the circulation pipe 35) 76 of the reduction agent injection apparatus 43 to the circulation pipe 35. The first connection point 77 may be disposed on the downstream side of the second connection point 76.

A pH meter 78 is attached to the circulation pipe 35 on the downstream side of the second connection point 76. A conductivity meter 79 is attached to the circulation pipe 35 between the valve 33 and the first connection point 77.

The method depositing noble metal on the structure member of the nuclear plant according to the present embodiment will be explained in detail by referring to FIG. 1. The platinum deposition is executed during the decomposition of the reduction agent after finish of the reduction decontamination of the chemical decontamination. The chemical decontamination mainly includes the oxidation decontamination process by the oxidation decontamination solution, the oxidation decontamination agent decomposition process, the reduction decontamination process by the reduction decontamination solution, the reduction decontamination agent decomposition process, and the purification process. The procedure shown in FIG. 1 includes not only the deposition of platinum on the structure member but also the processes of the chemical decontamination on the surface of the structure member and the decomposition of the reduction agent (for example, hydrazine) included in the processing solution used for the platinum deposition. Firstly, the noble metal injection apparatus 30 is connected to a piping being the film forming object (step S1). Namely, as described above, the circulation pipe 35 is connected to the recirculation pipe (the structure member of the nuclear plant) 22 which is the piping of the film forming object during the operation stop period of the BWR plant after the operation of the BWR plant is stopped for the periodic inspection of the BWR plant.

The oxidation decontamination and reduction decontamination of the chemical decontamination are executed for the noble metal depositing object (step S2). In the BWR plant experiencing an operation, an oxide film including a radioactive nuclide is formed on the inner surface of the recirculation pipe 22 in contact with the cooling water (hereinafter referred to as reactor water) in the RPV 12. An example of step S2 is a process of removing the oxide film from the inner surface of the recirculation pipe 22 by a chemical process. The platinum deposition on the piping being the film forming object aims at the deposition suppression of the radioactive nuclide on the inner surface of the recirculation pipe and the stress corrosion cracking suppression, though at the time of platinum deposition, the chemical decontamination is preferably executed beforehand for the inner surface of the recirculation pipe 22.

The chemical decontamination applied at and after step S2 is the well-known method (see Japanese Patent Laid-Open No. 2000-105295). Firstly, in the state that the valves 34, 33, 59, 58, 57, and 53 are opened and the other valves are closed, the circulation pumps 32 and 54 are driven. By doing this, the water in the surge tank 31 is circulated in the closed loop of the circulation pipe 35 and the recirculation pipe 22. The circulating water is heated by the heater 56 and the temperature of this water is adjusted to 90° C. When the temperature of the water becomes 90° C., the valve 36 is opened. The potassium permanganate of a necessary quantity is supplied into the pipe 72 through the ejector 37 and furthermore, is introduced into the surge tank 31 by the water flowing in the pipe 72. The potassium permanganate is dissolved in the water in the surge tank 31 and an oxidation decontamination solution (a potassium permanganate aqueous solution) is generated. The oxidation decontamination solution is supplied to the recirculation pipe 22 by the drive of the circulation pump 32 from the surge tank 31 through the circulation pipe 35. The oxidation decontamination solution oxidizes and dissolves contaminants (including a radioactive nuclide) such as the oxide film formed on the inner surface of the recirculation pipe 22 (the oxidation decontamination process).

After finish of the oxidation decontamination, the oxalic acid supplied from the ejector 37 into the pipe 72 is injected into the surge tank 31. By the oxalic acid, the potassium permanganate included in the oxidation decontamination solution is decomposed (the oxidation decontamination agent decomposition process). Thereafter, the reduction decontamination solution (oxalic acid aqueous solution) which is generated in the surge tank 31 and is adjusted for pH is supplied from the circulation pipe 35 into the recirculation pipe 22 by the circulation pump 32 and the reduction and dissolution of the corrosion products (including a radioactive nuclide) deposited on the inner surface of the recirculation pipe 22 are executed (the reduction decontamination process). If the valve 46 is opened and the injection pump 45 is driven, the hydrazine in the bath tank 44 is injected into the circulation pipe 35 through the injection pipe 47. The pH of the reduction decontamination solution is adjusted by the hydrazine injected from the bath tank 44 into the circulation pipe 35. In the present embodiment, the hydrazine which is a reduction agent used when depositing platinum on the inner surface of the recirculation pipe 22 is used as a pH adjustment agent of the reduction decontamination solution at the reduction decontamination process. The oxalic acid concentration of the reduction decontamination solution supplied to the recirculation pipe 22 is 200 ppm and the pH of the reduction decontamination solution is 2.5. When the reduction decontamination solution makes contact with the inner surface of the recirculation pipe 22, the corrosion products including the radioactive nuclide which are deposited on the inner surface of the recirculation pipe 22 are dissolved by the oxalic acid. The reduction decontamination solution in which the radioactive nuclide and corrosion products are dissolved are discharged into the circulation pipe 35 from the recirculation pipe 22. The valve 67 is opened, and the opening angle of the valve 58 is adjusted, thus a part of the reduction decontamination solution discharged into the circulation pipe 35 is introduced to the cation exchange resin tower 66 through the pipe 68. Metallic cations such as the metallic cations of the radioactive nuclide included in the reduction decontamination solution are adsorbed to the cation exchange resin in the cation exchange resin tower 66 and are removed. The reduction decontamination solution discharged from the cation exchange resin tower 66 and the reduction decontamination solution passing through the valve 58 are supplied again into the recirculation pipe 22 from the circulation pipe 35. As described above, the reduction decontamination solution circulates in the closed loop including the circulation pipe 35 and the recirculation pipe 22 and simultaneously executes the reduction decontamination of the inner surface of the recirculation pipe 22.

The finish of the reduction decontamination process is determined (step S3). The determination of the finish of the reduction decontamination process is executed, for example, based on the radiation dose of the recirculation pipe 22 which is a noble metal deposition object. The radiation dose of the recirculation pipe 22 is measured by the radiation detector and when the measured radiation dose is decreased to a preset radiation dose or smaller, the reduction decontamination process for the recirculation pipe 22 is decreased. When the elapsed time after start of the reduction decontamination process becomes the predetermined time, the reduction decontamination process may finish. Further, the radiation dose of the cation exchange resin tower 66 for adsorbing metallic cations of the radioactive nuclide is measured by the radiation detector and the finish of the reduction decontamination process may be determined based on the measured value of the radiation dose.

The decomposition of a part of the reduction decontamination agent included in the reduction decontamination solution and the injection of the chemical including noble metal ions are executed (step S4). After the reduction decontamination process finished, the reduction decontamination agent decomposition process is started. The drive of the injection pump 45 is stopped, and the valve 46 is closed totally, and the injection of hydrazine into the circulation pipe 35 from the bath tank 44 is stopped. Furthermore, the valve 74 is opened, and a degree of opening of the valve 59 is adjusted, and a part of the reduction decontamination solution flowing in the circulation pipe 35 is supplied to the decomposition apparatus 73. The oxalic acid and hydrazine included in the reduction decontamination solution are decomposed by the action of the hydrogen peroxide supplied to the decomposition apparatus 73 from the bath tank 48 through the supply pipe 51 and the active carbon catalyst in the decomposition apparatus 73. The decomposition of the oxalic acid and hydrazine in the decomposition apparatus 73 is executed by circulating the reduction decontamination solution in the closed loop formed by the recirculation pipe 22 and the circulation pipe 35. The pH of the reduction decontamination solution becomes larger slowly by the decomposition of the oxalic acid included in the reduction decontamination solution. When the pH of the reduction decontamination solution (oxalic acid aqueous solution) measured by the pH meter 78 becomes, for example, 4, the supply pump 50 is stopped and the valves 52 and 74 are closed totally. By doing this, the decomposition of the oxalic acid is stopped. The reduction decontamination solution that the pH became 4 due to the decomposition of the oxalic acid does not include hydrazine. Furthermore, the valve 67 is closed and the supply of the reduction decontamination solution to the cation exchange resin tower 66 is stopped. Further, the oxalic acid concentration of the reduction decontamination solution of pH 4 is 50 ppm.

In this state, the valve 41 is opened and the injection pump 40 is driven. The aqueous solution of the chemical (first chemical) including platinum ions in the bath tank 39, that is, the aqueous solution including $Na_2(Pt(OH)_6) \cdot nH_2O$ is injected into the aqueous solution including the oxalic acid of pH 4 flowing in the circulation pipe 35 through the injection pipe 42. The platinum is in the ion state in the aqueous solution including $Na_2(Pt(OH)_6) \cdot nH_2O$. The aqueous solution including platinum ions and oxalic acid generated by injecting the chemical including platinum ions is supplied from the circulation pipe 35 into the recirculation pipe 22, is returned from the recirculation pipe 22 into the circulation pipe 35, and is circulated in the closed loop formed by the circulation pipe 35 and the recirculation pipe 22.

Whether the noble metal concentration of the aqueous solution including noble metal ions and the reduction decontamination agent is the preset concentration or not is determined (step S5). The determination as to whether the platinum ion concentration of the aqueous solution including platinum ions and oxalic acid which is supplied from the circulation pipe 35 to the recirculation pipe 22 has become the preset concentration or not is carried out based on the elapsed time from the injection start of the chemical including platinum ions from the bath tank 39 to the circulation pipe 35. Until the platinum ion concentration of the aqueous solution supplied from the circulation pipe 35 to the recirculation pipe 22 becomes the preset concentration (for example, 100 ppt), the aqueous solution circulates in the aforementioned closed loop and the injection of the chemical including platinum ions into the aqueous solution is executed continuously. For example, assume that the platinum ion concentration of the chemical including platinum ions in the bath tank 39 is 100 ppt, and the flow rate of the aqueous solution flowing in the circulation pipe 35 is 10, and the flow rate of the chemical including platinum ions which is supplied from the bath tank 39 into the circulation pipe 35 is 2.5. In this case, if the chemical including platinum ions with a platinum ion concentration of 100 ppt is injected into the aqueous solution while the aqueous solution circulates 4 times in the aforementioned closed loop, the platinum ion concentration of the aqueous solution including platinum ions and oxalic acid which is supplied from the circulation pipe 35 into the recirculation pipe 22 becomes 100 ppt. For example, when the time required for the aqueous solution to circulate 4 times in the closed loop elapses from the point of time when the injection of the chemical including platinum ions is started on the basis of the first connection point, it is determined that the platinum ion concentration of the aqueous solution has become the preset concentration (for example, 100 ppt).

The reduction agent is injected (step S6). When the platinum ion concentration of the aqueous solution which circulates in the closed loop and into which the chemical including platinum ions was injected at the first connection point became 100 ppt, the valve 46 is opened and the injection pump 45 is driven. The injection of hydrazine which is a reduction agent from the bath tank 44 into the circulation pipe 35 is started. By the injection of hydrazine, the aqueous solution (processing solution) at 90° C. including platinum ions, hydrazine which is a reduction agent, and oxalic acid is supplied from the circulation pipe 35 into the recirculation pipe 22. To positively produce a reduction reaction of platinum ions, in the present embodiment, hydrazine is injected excessively so as to increase the pH of the aqueous solution for example, to 7, for the platinum ion concentration based on the measured value by the pH meter 78. Since the oxalic acid concentration of the aqueous solution obtaining pH 4 due to the decomposition of the oxalic acid is as low as 50 ppm, the injection quantity of hydrazine may be small. When injecting hydrazine into the oxalic acid aqueous solution of pH 4 having a platinum ion concentration of 100 ppt and setting the hydrazine concentration of the oxalic acid aqueous solution to 100 ppt, the injection quantity of hydrazine is small, so that the pH of the oxalic acid aqueous solution is scarcely changed from 4.

The aqueous solution of pH 7 at a temperature of 90° C. including platinum ions (concentration: 100 ppt), hydrazine, and oxalic acid flows in the recirculation pipe 22 and makes contact with the inner surface of the recirculation pipe 22. The platinum ions included in this aqueous solution are reduced by the hydrazine on the inner surface of the recirculation pipe 22 and are deposited as platinum particles on the inner surface of the recirculation pipe 22. An inside diameter of the recirculation pipe 22 is extremely larger than an inside diameter of the circulation pipe 35, so that it takes about one hour until an entire region (a region in the recirculation pipe 22 between the connection point of the purification system pipe 20 connected with the circulation pipe 35 to the recirculation pipe 22 and the connection point of the circulation pipe 35 to the recirculation pipe 22 on the downstream side of the recirculation pipe 22) with platinum deposited on the inner surface in the recirculation pipe 22 is filled with the aqueous solution of pH 7 at a temperature of 90° C. including platinum ions, hydrazine, and oxalic acid which is supplied from the circulation pipe 35. Therefore, the aqueous solution is supplied to the recirculation pipe 22 and the aqueous solution including platinum ions and oxalic acid which exists originally in the recirculation pipe 22 is discharged from the recirculation pipe 22 and is returned to the circulation pipe 35. The hydrazine is injected into the aqueous solution returned into the circulation pipe 35 from the bath tank 44. The aqueous solution including platinum ions and oxalic acid returned from the recirculation pipe 22 becomes an aqueous solution including platinum ions, hydrazine, and oxalic acid and including the injected hydrazine and is supplied to the recirculation pipe 22.

The injection of the chemical including noble metal ions, and the reduction agent is stopped (step S7). When one hour elapses from the point of time when the supply of the aqueous solution including platinum ions, hydrazine, and oxalic acid to the recirculation pipe 22 was started, the entire region with platinum deposited on the inner surface in the recirculation pipe 22 is filled with the aqueous solution of pH 7 at a temperature of 90° C. including platinum ions, hydrazine, and oxalic acid, as described above. Therefore, platinum particles are deposited on the entire region of the inner surface in contact with the aqueous solution of the recirculation pipe 22. When one hour elapses from the point of time when the supply of the aqueous solution including platinum ions, hydrazine, and oxalic acid to the recirculation pipe 22 was started, the drive of the injection pumps 40 and 45 is stopped, and the valves 41 and 46 are closed totally, and the injection of each of the chemical including platinum ions, and hydrazine into the circulation pipe 35 is stopped. At this time, platinum particles are deposited on the inner surface in a film shape in the entire region with platinum deposited on the inner surface in the recirculation pipe 22.

The decomposition of the reduction decontamination agent and the reduction agent is executed (step S8). After the injection of the chemical including platinum ions, and hydrazine is stopped, the reduction decontamination agent decomposition process is restarted. When the drive of the injection pumps 40 and 45 is stopped and the valves 41 and 46 are closed totally, the valve 74 is opened, and a degree of the opening of the valve 59 is adjusted, and a part of the aqueous solution including platinum ions, hydrazine (the reduction agent), and oxalic acid is supplied to the decomposition apparatus 73, similarly to step S4. Similarly to the decomposition of the oxalic acid and hydrazine (pH adjustment agent) described above, the hydrazine and oxalic acid included in the aqueous solution are decomposed by the actions of hydrogen peroxide and ruthenium of the activated carbon catalyst filled in the decomposition apparatus 73 (the reduction decontamination agent decomposition process). The platinum ions included in the aqueous solution supplied to the decomposition apparatus 73 become platinum by the action of the hydrazine included in the aqueous solution and are deposited into the aqueous solution as platinum nano particles. This platinum acts as a catalyst similarly to the ruthenium in the decomposition apparatus 73. In the decomposition apparatus 73, the oxalic acid and hydrazine included in the supplied aqueous solution are also decomposed by the actions of the hydrogen peroxide supplied to the decomposition apparatus 73 by the pipe 51 and the aforementioned platinum generated in the aqueous solution. The aqueous solution discharged from the decomposition apparatus 73 is mixed with the aqueous solution flowing in the circulation pipe 35 and the conductivity of this aqueous solution is measured by the conductivity meter 79. When the measured conductivity of the aqueous solution is lowered to the preset conductivity, the oxalic acid concentration of the aqueous solution is lowered to 10 ppm and the decomposition of the oxalic acid and hydrazine finishes. The supply pump 50 is stopped and the valves 52 and 74 are closed in the totally closed state.

The purification of the aqueous solution in which the reduction decontamination agent and reduction agent are decomposed is executed (step S9). After the decomposition of the oxalic acid and hydrazine finished, the valve 64 is opened, and the valve 57 is closed, and the valves 67 and 70 are opened, and the valve 58 is closed. The heating of the aqueous solution in which the oxalic acid and hydrazine are decomposed by the heater 56 is stopped and the aqueous solution is cooled by the cooler 63 and the temperature of the aqueous solution is adjusted, for example, to 60° C. This aqueous solution including platinum ions which has been cooled to 60° C. is supplied to the cation exchange resin tower 66 and the mixed bed resin tower 69. The platinum ions included in the aqueous solution and the platinum particles deposited in the aqueous solution are collected by the cation exchange resin tower 66 and the mixed bed resin tower 69 and are removed from the aqueous solution. The other impurities included in the aqueous solution, that is, the metallic cations including the radioactive nuclide are removed by the cation exchange resin tower 66 and the mixed bed resin tower 69 and the anions are removed by the mixed bed resin tower 69 (the purification process).

The waste solution is treated (step S10). After the purification process finished, the circulation pipe 35 is connected to a waste solution treatment apparatus (not shown) by a high-pressure hose (not shown) including a pump (not shown). The aqueous solution existing in the circulation pipe 35 and the recirculation pipe 22 after finish of the purification process is a radioactive waste solution. The aqueous solution drive the pump installed on the high-pressure hose, is discharged into the waste solution treatment apparatus (not shown) from the circulation pipe 35 through the high-pressure hose and are treated by the waste solution treatment apparatus. When all the aqueous solution in the circulation pipe 35 and the recirculation pipe 22 is discharged into the waste solution treatment, all the processes of the chemical decontamination finish.

When the oxidation decontamination process, oxidation decontamination agent decomposition process, reduction decontamination process, reduction decontamination agent decomposition process, and purification process are repeated several times, for example, 2 or 3 times, each step of steps S4 to S8 is executed at the final reduction decontamination agent decomposition process and step S9 is executed at the final purification process.

After all the processes of the chemical decontamination finished, the high-pressure hose for connecting the circulation pipe 35 and the waste solution treatment apparatus is removed and both ends of the circulation pipe 35 are removed from the recirculation pipe 22. The recirculation pipe 22 and the purification system pipe 20 are restored to the state before the connection of the circulation pipe 35 and then the operation of the BWR plant is started.

In the present embodiment, a part of the oxalic acid included in the reduction decontamination solution is decomposed (step S4) and in the state that the oxalic acid remains, platinum ions and hydrazine are added in the reduction decontamination solution, that is, the aqueous solution including the oxalic acid, so that after the deposition of platinum ions on the inner surface of the recirculation pipe 22 finished, the aqueous solution including platinum ions, hydrazine, and oxalic acid is supplied to the decomposition apparatus 73. The hydrazine and oxalic acid included in the aqueous solution are decomposed in the decomposition apparatus 73 by the actions of not only the catalyst (for example, activated carbon catalyst) in the decomposition apparatus 73 and the hydrogen peroxide but also the platinum generated by the reduction of the platinum ions in the aqueous solution by hydrazine. The decomposition of the hydrazine and oxalic acid included in the aqueous solution finishes earlier. Therefore, in the present embodiment, the time required for the decomposition of the reduction decontamination agent which is the sum of the time required for the decomposition of the oxalic acid at step S4 and the time required for the decomposition of the oxalic acid at step S8 can be shortened than the time required for the decomposition of the reduction decontamination agent at the reduction decontamination agent decomposition process described in Japanese Patent Laid-Open No. 2000-105295. The present embodiment can shorten the time required for the execution of both of the chemical decontamination onto the inner surface of the recirculation pipe 22 and the deposition of platinum particles onto the inner surface.

In addition, it may be considered that during the period of the operation stop of the BWR plant, the chemical decontamination onto the inner surface of the recirculation pipe 22 is executed using the noble metal injection apparatus 30, and after the final purification process of the chemical decontamination finished, the aqueous solution including platinum ions, and hydrazine is brought into contact with the inner surface of the recirculation pipe 22, and platinum particles are deposited on the inner surface of the recirculation pipe 22. In this case, the time required for the decomposition of the reduction decontamination agent in the chemical decontamination becomes equal to the time required for the decomposition of the reduction decontamination agent at the reduction decontamination agent decomposition process described in Japanese Patent Laid-open No. 2000-105295 and furthermore, the time for the decomposition of the hydrazine which is a reduction agent used when depositing platinum particles on the inner surface of the recirculation pipe 22 becomes necessary.

The aforementioned time required for the decomposition of the reduction decontamination agent in the present embodiment can be shortened than the time required for the decomposition of the reduction decontamination agent in the aforementioned case. Furthermore, in the present embodiment, the decomposition of the hydrazine used for the deposition of platinum particles on the inner surface of the recirculation pipe 22 can be executed within the decomposition time of the reduction decontamination agent (the oxalic acid) at step S8 because decomposition speed of hydrazine is fast. Therefore, the present embodiment does not require the time for the decomposition of the hydrazine used for the deposition of platinum particles as in the aforementioned case except the time required for the decomposition of the reduction decontamination agent.

It may be considered that the oxalic acid included in the reduction decontamination solution is not decomposed, and hydrazine is added to the reduction decontamination solution of pH 2.5 including an oxalic acid of 2000 ppm, and the pH of the reduction decontamination solution is set to 3.5. However, when the pH of the reduction decontamination solution is increased to 3.5 by addition of hydrazine, oxalic acid iron dissolved in the reduction decontamination solution of pH 2.5 is deposited. When the chemical including platinum ions, and hydrazine which is a reduction agent are added to the reduction decontamination solution of pH 3.5 with the oxalic acid iron deposited, the platinum ions are reduced by the hydrazine, are deposited on the surface of the oxalic acid iron deposited in the reduction decontamination solution, and are scarcely deposited on the inner surface of the recirculation pipe 22.

A part of the oxalic acid included in the reduction decontamination solution is decomposed and the pH of the reduction decontamination solution is increased, thus the quantity of the oxalic acid iron deposited is decreased. Therefore, when the chemical including platinum ions, and hydrazine which is a reduction agent are injected to the reduction decontamination solution with the pH thereof increased, the quantity of platinum particles deposited on the inner surface of the recirculation pipe 22 is increased. In such the present embodiment, the use efficiency of the injected platinum ions is increased. Namely, in the present embodiment, the quantity of platinum ions which are not deposited uselessly on the inner surface of the recirculation pipe 22 and are wasted can be decreased.

When a part of the oxalic acid included in the reduction decontamination solution is decomposed by the decomposition apparatus 73 and the pH of the reduction decontamination solution is increased to 3.5, the oxalic acid concentration of the reduction decontamination solution is decreased down to 50 ppm, so that thereafter, even if the hydrazine which is a reduction agent is injected into the reduction decontamination solution, no oxalic acid iron is deposited. In the present embodiment, a part of the oxalic acid is decomposed at step S4 and the pH of the reduction decontamination solution is set to 4, so that no oxalic acid iron is deposited in the reduction decontamination solution and the quantity of platinum particles deposited on the inner surface of the recirculation pipe 22 is increased.

According to the present embodiment, platinum ions and hydrazine which is a reduction agent are injected into the reduction decontamination solution that the pH of the reduction decontamination solution becomes pH 4 higher than pH 3.5 by the decomposition of the oxalic acid, that is, the aqueous solution including the oxalic acid and the aqueous solution of pH 4 including platinum ions, hydrazine, and oxalic acid is brought into contact with the inner surface of the recirculation pipe 22, so that in a state that the dissolution of the recirculation pipe 22 is not caused and the aqueous solution in contact with the inner surface of the recirculation pipe 22 includes the oxalic acid, platinum particles can be deposited efficiently on the inner surface of the recirculation pipe 22. Particularly, since this aqueous solution includes hydrazine which is a reduction agent, the platinum ions are reduced efficiently by the hydrazine to platinum in the neighborhood of the inner surface of the recirculation pipe 22. Therefore, even if the aqueous solution in contact with the inner surface of the recirculation pipe 22 is at a low temperature of 90° C., the platinum particles are deposited efficiently on the inner surface of the recirculation pipe 22 and the deposited platinum particles are formed in a minute film shape on the inner surface.

In the present embodiment, the hydrazine which is a reduction agent is injected into the aqueous solution including platinum ions and oxalic acid, so that the time required for the deposition of platinum in a predetermined quantity on the inner surface of the recirculation pipe 22 can be shortened than the case of platinum deposition described in Japanese Patent Laid-open No. 2006-38483, by the action of the hydrazine.

Platinum particles are deposited on the inner surface of the recirculation pipe 22 during the operation stop of the BWR plant, so that the BWR plant can be started in the state that platinum particles are deposited on the inner surface of the recirculation pipe 22. Therefore, the formation of an oxide film easily taking in $^{60}$Co, which is a radioactive nuclide, on the inner surface of the recirculation pipe 22 after the start of the BWR plant, particularly for 3 months from the start of the BWR plant, is suppressed by platinum particles deposited on the inner surface of the recirculation pipe 22. This contributes to a decrease in a surface dose rate of the recirculation pipe 22.

When hydrogen is injected into the reactor water in the RPV 12 from the start time of the BWR plant, the oxygen dissolved in the reactor water flowing in the recirculation pipe 22 reacts with the aforementioned hydrogen to form water by the catalyst action of the platinum deposited on the inner surface of the recirculation pipe 22, so that the dissolved oxygen concentration in the reactor water can be decreased. Therefore, the generation of stress corrosion cracking in the recirculation pipe 22 made of stainless steel at the start time of the BWR plant can be suppressed. In relation to the supply of the reactor water flowing in the recirculation pipe 22 into the RPV 12, the decrease in the dissolved oxygen concentration in the reactor water flowing in the recirculation pipe 22 causes a decrease in the dissolved oxygen concentration in the reactor water in the RPV 12 and the generation of stress corrosion cracking in a reactor internal (for example, a core shroud) the surface of which makes contact with the reactor water in the RPV 12 is suppressed.

In the present embodiment, the injection of the chemical including platinum ions into the aqueous solution including oxalic acid is executed by circulating the aqueous solution in the closed loop formed by the recirculation pipe 22 and the circulation pipe 35, so that compared with a embodiment 2 described later, the platinum ion concentration in the aqueous solution including platinum ions and oxalic acid to be supplied to the recirculation pipe 22 can be adjusted more precisely to the preset concentration of the platinum ions than the embodiment 2 described later.

In the present embodiment, hydrazine which is a reduction agent capable of being used as a pH adjustment agent or is used, so that there is no need to separately install the reduction agent injection apparatus 43 and a pH adjustment agent injection apparatus 93 and the noble metal injection apparatus 30 can be made compact.

In the present embodiment, since the noble metal injection apparatus 30 is heated to 90° C. within the range from 60° C. to 100° C., the platinum particle deposition on the inner surface of the recirculation pipe 22 can be executed in a short period of time and the noble metal injection apparatus 30 does not need to be made in a pressure-resistant structure and can be made compact.

As a reduction agent, ammonia usable as a pH adjustment agent may be used in place of hydrazine. When using ammonia, the bath tank 44 of the noble metal injection apparatus 30 is filled with ammonia. Ammonia is injected into the circulation pipe 35 at the reduction decontamination process of step S2 and from the bath tank 44 at step S6.

Embodiment 2

Figure 9:
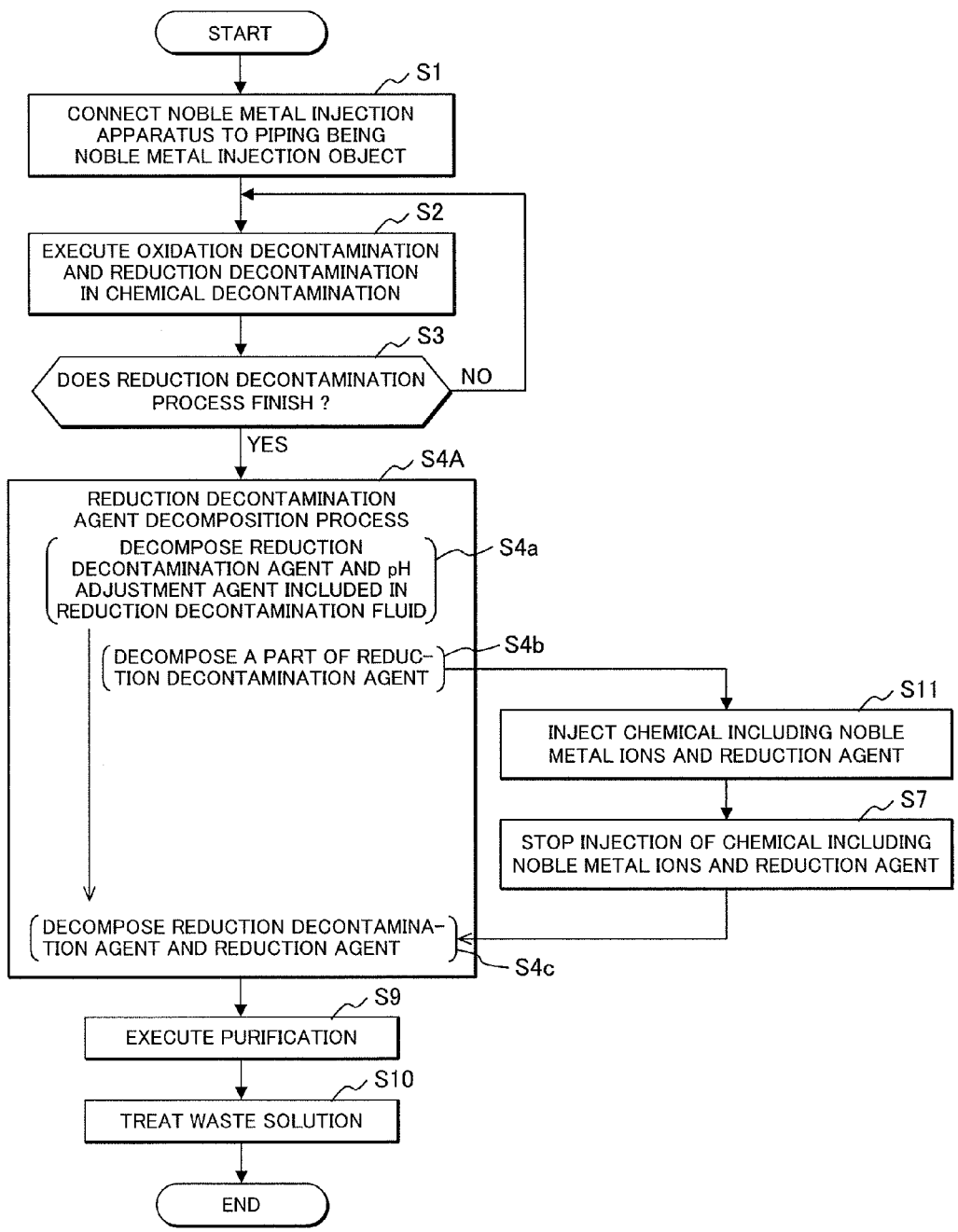
FIG. 9 is a flow chart showing a procedure of a method of depositing a noble metal on a structure member of a nuclear plant according to embodiment 2 which is another embodiment of the present invention, applied to a recirculation pipe of a boiling water nuclear power generation plant.

A method of depositing a noble metal on a nuclear plant according to embodiment 2 which is another embodiment of the present invention will be explained by referring to FIGS. 9 and 3. The method of depositing the noble metal on the structure member of the nuclear plant of the present embodiment is applied to the recirculation pipe of the BWR plant.

The method of depositing the noble metal on the structure member of the nuclear plant of the present embodiment executes a procedure where steps S4 and S8 are changed to step S4A, step S5 is deleted, and step S11 is added in the method of depositing the noble metal on the structure member of the nuclear plant of the embodiment 1. Each of the other processes in the procedure of the method of depositing the noble metal on the structure member of the nuclear plant of the present embodiment is equal to each process of the procedure of the method of depositing the noble metal on the structure member of the nuclear plant of the embodiment 1. In the method of depositing the noble metal on the structure member of the nuclear plant of the present embodiment, the noble metal injection apparatus 30 used in the embodiment 1 is used.

The method of depositing the noble metal on the structure member of the nuclear plant of the present embodiment will be explained centering on the processes different from the method of depositing the noble metal on the structure member of the nuclear plant of the embodiment 1.

At step S1, both ends of the circulation pipe 35 of the noble metal injection apparatus 30 are connected to the recirculation pipe 22 of the BWR plant, similarly to the embodiment 1. Steps S2 and S3 are executed and then step S4A is executed.

The reduction decontamination agent decomposition process is executed (step S4A). The reduction decontamination agent decomposition process includes a decomposition process of the reduction decontamination agent and the pH adjustment agent (step S4a) and a decomposition process of the reduction decontamination agent and the reduction agent (step S4c). In step S4a, the decomposition of the oxalic acid and hydrazine included in the reduction decontamination solution is executed similarly to step S4 of the embodiment 1 by the decomposition apparatus 73 to which hydrogen peroxide is supplied. A part of the oxalic acid included in the reduction decontamination solution (the oxalic acid aqueous solution) is decomposed (step S4b).

When a part of the reduction decontamination agent included in the reduction decontamination solution is decomposed, the chemical including noble metal ions, and the reduction agent are injected (step S11). Similarly to step 4 of the embodiment 1, when a part of the oxalic acid is decomposed and the pH of the oxalic acid aqueous solution is increased to a preset pH (for example, pH 4), the chemical including platinum ions is injected. Concretely, the valve 41 is opened and the injection pump 40 is driven, and the aqueous solution of the chemical (first chemical) including platinum ions having a platinum ion concentration of 400 ppt is injected into the aqueous solution including the oxalic acid of pH 4 flowing in the circulation pipe 35 from the bath tank 39. At this time, the flow rate of the oxalic acid aqueous solution flowing in the circulation pipe 35 is 10. The flow rate of the chemical including platinum ions supplied to the circulation pipe 35 through the injection pipe 42 is 2.5 and is ¼ of the flow rate of the oxalic acid aqueous solution. As a result, the platinum ion concentration of the oxalic acid aqueous solution into which the chemical including platinum is injected becomes 100 ppt.

Thereafter, the valve 46 is opened, and the injection pump 45 is driven, and the hydrazine which is a reduction agent in the bath tank 44 is injected into the aqueous solution including the platinum ions (concentration: 100 ppt) and oxalic acid flowing in the circulation pipe 35. The injection of the hydrazine is executed when the aqueous solution including the platinum ions and oxalic acid reaches the second connection point. The pH of the aqueous solution, for example, becomes 7 by the injection of the hydrazine. The aqueous solution of pH 7 at 90° C. including platinum ions (concentration: 100 ppt), hydrazine, and oxalic acid is supplied from the circulation pipe 35 to the recirculation pipe 22. This aqueous solution makes contact with the inner surface of the recirculation pipe 22 and the platinum ions are reduced by the hydrazine on the inner surface of the recirculation pipe 22 and are deposited on the inner surface as platinum particles.

When one hour elapses after the start of supply of the aqueous solution including platinum ions, hydrazine, and oxalic acid to the recirculation pipe 22, the injection of the chemical including platinum ions, and hydrazine into the circulation pipe 35 is stopped (step S7), similarly to the embodiment 1.

The supply of the aqueous solution including platinum ions and oxalic acid returned from the recirculation pipe 22 to the circulation pipe 35 to the decomposition apparatus 73 is continued during the execution of injection of the chemical including platinum ions, and hydrazine which is a reduction agent into the circulation pipe 35 at step S11. Therefore, the decomposition of the oxalic acid in the decomposition apparatus 73 is executed continuously.

When the injection of the chemical including platinum ions, and hydrazine into the circulation pipe 35 is stopped and the aqueous solution including platinum ions, hydrazine (reduction agent), and oxalic acid is discharged from the recirculation pipe 22 into the circulation pipe 35, this aqueous solution is supplied to the decomposition apparatus 73 and the decomposition process of step S4c is executed. Namely, the oxalic acid and hydrazine (reduction agent) are decomposed by the action of the activated carbon catalyst in the decomposition apparatus 73 to which hydrogen peroxide is supplied. The platinum ions included in the aqueous solution are reduced by the hydrazine to platinum, so that the platinum acts as the catalyst. Therefore, the decomposition of the oxalic acid and hydrazine is executed earlier. The hydrazine which is a reduction agent injected from the recirculation pipe 22 is not discharged from the recirculation pipe 22 until one hour elapses after the start of supply of the aqueous solution including platinum ions, hydrazine, and oxalic acid to the recirculation pipe 22, so that the oxalic acid is decomposed by the decomposition apparatus 73.

After the oxalic acid concentration of this aqueous solution is decreased to the decomposition finish set concentration, for example, 10 ppm, and the decomposition of the oxalic acid finished, each process of steps S9 and S10 is executed similarly to the embodiment 1. After the process of step S10 finished, the circulation pipe 35 of the noble metal injection apparatus 30 is removed from the recirculation pipe 22. Thereafter, the BWR plant with platinum particles deposited on the inner surface of the recirculation pipe 22 is started.

The present embodiment can obtain each effect generated in the embodiment 1. In the present embodiment, while supplying the aqueous solution including platinum ions, hydrazine, and oxalic acid to the recirculation pipe 22, the aqueous solution including the oxalic acid discharged from the recirculation pipe is supplied to the decomposition apparatus 73 and the oxalic acid can be decomposed. Therefore, in the present embodiment, the time required for the decomposition of the oxalic acid, that is, the reduction decontamination agent can be shortened more than that of the embodiment 1.

A noble metal injection apparatus 30B or 30C which will be explained later may be used in the present embodiment in place of the noble metal injection apparatus 30.

Embodiment 3

Figure 10:
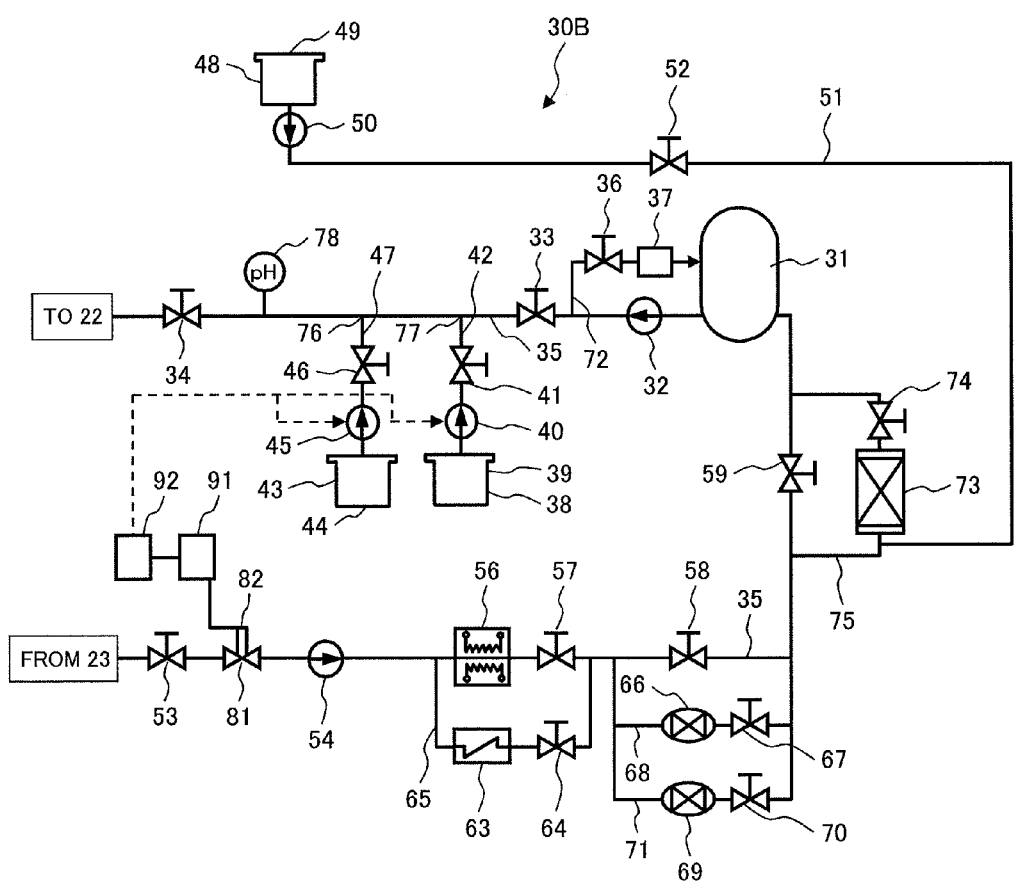
FIG. 10 shows a detailed structural diagram showing a method of depositing a noble metal on a structure member of a nuclear plant according to embodiment 3 which is other embodiment of the present invention, applied to a recirculation pipe of a boiling water nuclear power generation plant.
Figure 11:
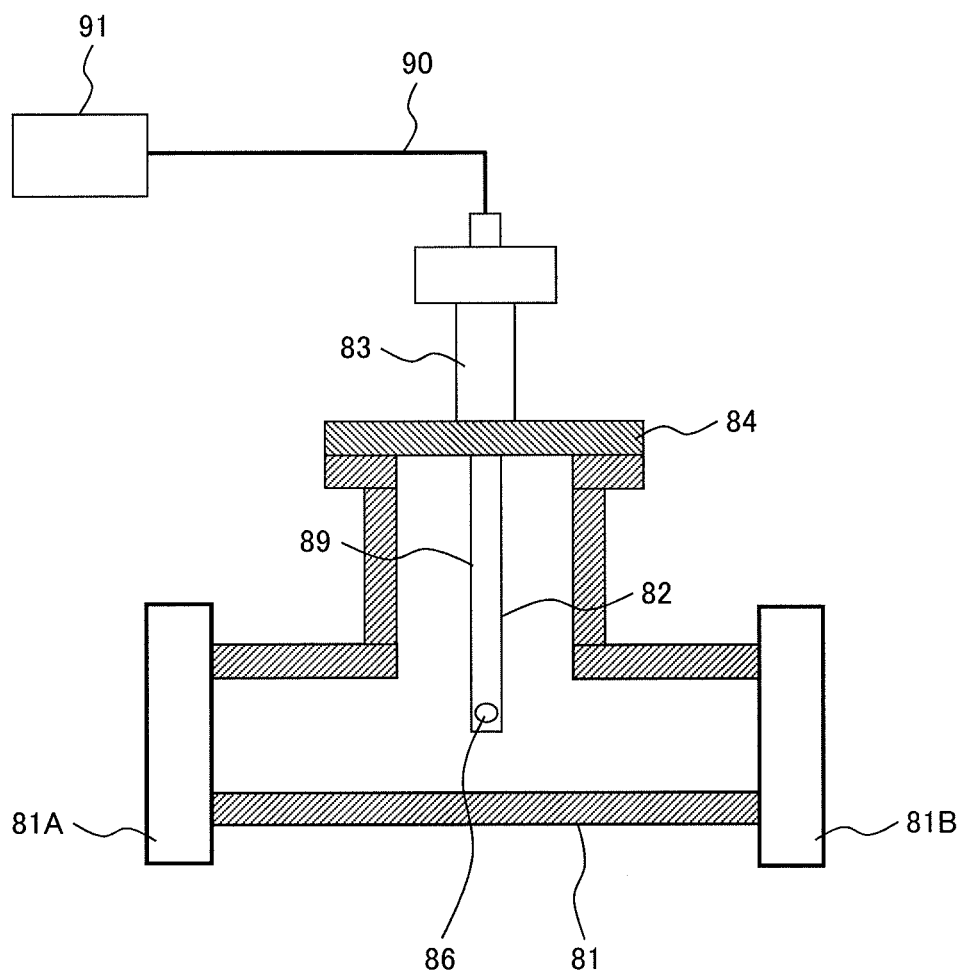
FIG. 11 is an explanatory drawing showing an attachment state of a quartz crystal microbalance apparatus shown in FIG. 10 to a circulation pipe.
Figure 12:
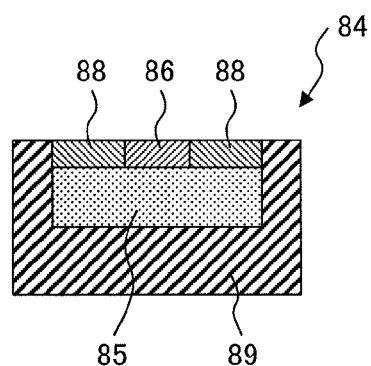
FIG. 12 is a detailed longitudinal sectional view of a quartz crystal microbalance apparatus shown in FIG. 11.

A method of depositing a noble metal on a structure member of a nuclear plant according to embodiment 3 which is other embodiment of the present invention will be explained by referring to FIGS. 10, 11, and 12. The method of depositing the noble metal on the structure member of the nuclear plant of the present embodiment is applied to the recirculation pipe of the BWR plant.

The method of depositing the noble metal on the structure member of the nuclear plant of the present embodiment uses the noble metal injection apparatus 30B in place of the noble metal injection apparatus 30 used in the embodiment 1. In the method of depositing the noble metal on the structure member of the nuclear plant of the present embodiment using the noble metal injection apparatus 30B, the procedure shown in FIG. 1 is executed.

The noble metal injection apparatus 30B has a structure in which the quartz crystal microbalance apparatus 82, a film thickness calculation Apparatus 91, and a control apparatus 92 are added to the noble metal injection apparatus 30. The other structures of the noble metal injection apparatus 30B are the same as those of the noble metal injection apparatus 30.

The apquartz crystal microbalance apparatus 82 is installed on the circulation pipe 35 between the open/close valve 53 and the circulation pump 54. The attachment structure of the quartz crystal microbalance apparatus 82 on the circulation pipe 35 will be explained in detail by referring to FIG. 11. A valve bonnet 81 with the valve body removed is attached to the circulation pipe 35 between the open/close valve 53 and the circulation pump 54. Concretely, flanges 81A and 81B of the valve bonnet 81 are connected to the circulation pipe 35. The quartz crystal microbalance apparatus 82 is disposed in the valve bonnet 81. An electrode holder 89 extended long of the quartz crystal microbalance apparatus 82 is attached to a flange 84 attached to the valve bonnet 81 using a feed-through 83. In the valve bonnet 81, a metal member 86 is installed at the leading edge of the feed-through 83.

The detailed structure of the quartz crystal microbalance apparatus 82 will be explained by referring to FIG. 12. The quartz crystal microbalance apparatus 82 has a crystal 85, a metallic member 86, a seal member 88, and an electrode holder 89. The crystal 85 is installed in a hollow formed at the leading edge of the electrode holder 89. The metallic member 86 is attached to a surface of the crystal 85 on an open end side of the hollow of the electrode holder 89. The metal member 86 is a metal member (for example, a stainless steel member or a carbon steel member) of the same material as the structure member of the nuclear plant. In the present embodiment, the noble metal deposition object is the recirculation pipe 22 made of stainless steel, so that the metal member 86 is made of stainless steel. The seal member 88 covers all over the surface except the surface in contact with the metal member 86 and the electrode holder 89 among the surface of the crystal 85 installed in the hollow of the electrode holder 89. Two wires 90 penetrating the electrode holder 89 are connected to the crystal 85. Each of the wires 90 is connected to the noble metal thickness calculation apparatus (noble metal deposition quantity calculation apparatus) 91. The noble metal thickness calculation apparatus 91 is connected to the control apparatus 92. The noble metal deposition quantity measuring apparatus is comprised of the quartz crystal microbalance apparatus 82 and the noble metal thickness calculation apparatus 91.

The method of depositing the noble metal on the structure member of the nuclear plant of the present embodiment using the noble metal injection apparatus 30B will be explained by referring to FIG. 1. In the present embodiment, both ends of the circulation pipe 35 of the noble metal injection apparatus 30B are connected to the recirculation pipe 22 of the BWR plant similarly to the embodiment 1 at step S1. Thereafter, each process of steps S2 to S10 is executed. After the process of step S10 finished, the circulation pipe 35 of the noble metal injection apparatus 30B is removed from the recirculation pipe 22. Thereafter, the BWR plant that platinum particles are deposited on the inner surface of the recirculation pipe 22 is started.

In the present embodiment, the injection stop of the chemical including platinum ions, and hydrazine which is a reduction agent is executed based on the deposited quantity of platinum measured by the noble metal deposition quantity measuring apparatus.

The injection stop of the chemical including platinum ions, and hydrazine at step S7 of the present embodiment will be explained in detail. The aqueous solution including platinum ions, hydrazine, and oxalic acid is supplied into the recirculation pipe 22 by the injection of hydrazine at step S6 and the aqueous solution is soon discharged from the recirculation pipe 22 into the circulation pipe 35, and flows into the valve bonnet 81. Platinum particles are deposited on the surface of the metal member 86 of the quartz crystal microbalance apparatus 82 disposed in the valve bonnet 81, which surface is in contact with the aqueous solution, similarly to the deposition of platinum particles on the inner surface of the recirculation pipe 22 that is in effect when this aqueous solution flows in the recirculation pipe 22. The metal member 86 is made of stainless steel, so that deposition degree of the platinum particles on the surface of the metal member 86 is substantially equal to deposition degree of these on the inner surface of the recirculation pipe 22. The thickness of platinum particles in a film shape which is deposited on the inner surface of the recirculation pipe 22 can be known by measuring the thickness of platinum particles in a film shape which is deposited onto the surface of the metal member 86.

The measurement of the thickness of platinum particles in a film shape on the surface of the metal member 86 of the quartz crystal microbalance apparatus 82 will be explained in detail. While the aqueous solution including platinum ions, hydrazine, and oxalic acid is supplied to the recirculation pipe 22, a voltage is applied to the crystal 85 from the noble metal thickness calculation apparatus 91 through one wire 90. The crystal 85 vibrates by the application of the voltage and the metal member 86 also vibrates together with the crystal 85. The numbers of vibrations of the crystal 85 and the metal member 86 are transmitted to the noble metal thickness calculation apparatus 91 through another one wire 90 connected to the crystal 85. If platinum particles are deposited on the surface of the metal member 86, the metal member 86 becomes heavy, so that the number of vibrations of the crystal 85 including the metal member 86 is decreased from the number of vibrations of the crystal 85 including the metal member 86 when no platinum particles are deposited on the surface of the metal member 86. The difference between these vibrations indicates the increased weight of the metal member 86 due to the deposition of platinum particles on the surface of the metal member 86. The noble metal thickness calculation apparatus 91 calculates the difference between the vibrations, that is, the increased value of the weight of the metal member 86 due to the deposition of platinum particles based on the input number of vibrations. The increased value of the weight is the weight of platinum particles deposited on the surface of the metal member 86.

The noble metal thickness calculation apparatus 91 obtains the thickness of platinum particles in a film shape deposited on the surface of the metal member 86 using density of the platinum, similarly to the calculation of the thickness of a magnetite film by the film thickness calculation apparatus described in Japanese Patent Laid-open No. 2010-127788. The thickness of platinum particles deposited on the surface of the metal member 86 is measured continuously by the noble metal thickness calculation apparatus 91 while the aqueous solution including platinum ions, hydrazine, and oxalic acid is supplied to the recirculation pipe 22.

The control apparatus 91 inputs the thickness of platinum particles deposited on the surface of the metal member 86 which is obtained by the noble metal thickness calculation apparatus 91 and compares it with a preset thickness of platinum particles. When the thickness of the platinum particles obtained by the noble metal thickness calculation apparatus 91 becomes a preset thickness or larger, the control apparatus 91 stops the injection pumps 40 and 45 and totally closes the valves 41 and 46. The respective injections of the chemical including platinum ions, and hydrazine to the circulation pipe 35 are stopped.

Figure 13:
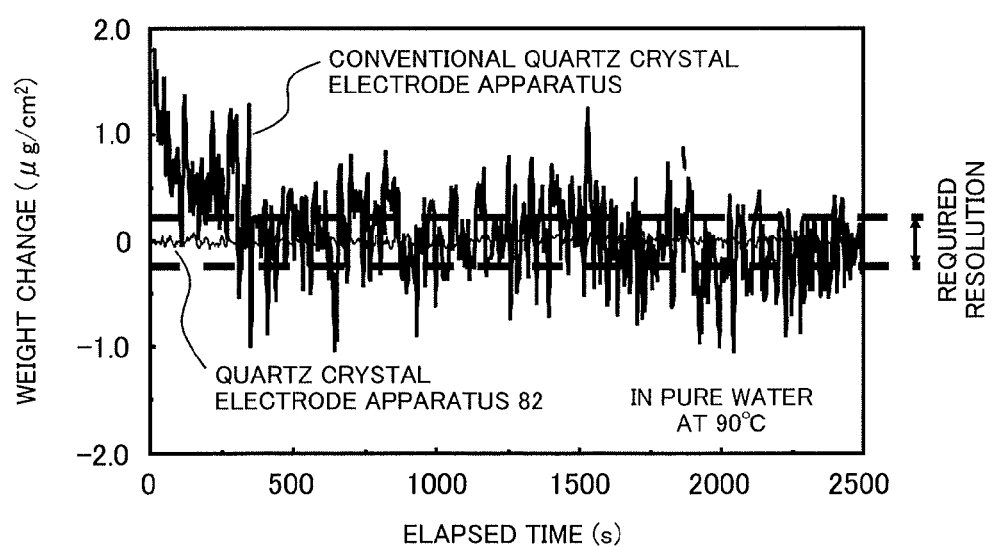
FIG. 13 is a characteristic diagram showing measurement results of weight changes measured by a quartz crystal microbalance apparatus shown FIG. 12 and soaked in pure water at 90° C.

The change in the weight of the metal member 86 due to the deposition of platinum particles was measured by the quartz crystal microbalance apparatus 82 immersed in pure water at 90° C. The measured results are shown in FIG. 13. The measured results of the quartz crystal microbalance apparatus 82 show that the weight change is substantially zero in pure water where platinum ions deposited on the surface of the metal member 86 exist scarcely and falls within the range of necessary resolution. The crystal 85 is covered with the seal member 88, so that in the quartz crystal microbalance apparatus 82, in which a liquid (for example, the aqueous solution including platinum ions, hydrazine, and oxalic acid) in contact with the surface of the metal member 86 does not make contact with the crystal 85, noise is decreased extremely compared with the conventional quartz crystal microbalance apparatus (refer to FIG. 13) shown in FIG. 6 described in Japanese Patent Laid-Open No. 2010-127788 and the measurement in pure water at a high temperature of 90° C. can be executed. In the quartz crystal microbalance apparatus 82, the measurement of the platinum ion deposition quantity can be executed even in the aqueous solution including an oxalic acid of pH 3.5 or higher at 90° C., similarly to the case in pure water at a high temperature of 90° C.

The present embodiment can obtain each effect produced in the embodiment 1. Further, the present embodiment uses the noble metal deposition quantity measuring apparatus, so that the platinum particle deposition quantity on the inner surface of the recirculation pipe 22 can be measured and the injection stop of the chemical including platinum ions, and hydrazine at step S7 can be executed automatically.

The noble metal deposition quantity measuring apparatus and the control apparatus 92 used in the present embodiment can be applied to the noble metal injection apparatus 30 used in the method depositing the noble metal on the structure member of the nuclear plant of embodiment 6 described later. In this case, the valve bonnet 81 having the quartz crystal microbalance apparatus 82 built-in is attached to the circulation pipe 35 between the open/close valve 53 and the circulation pump 54 in the noble metal injection apparatus 30C.

Embodiment 4

Figure 16:
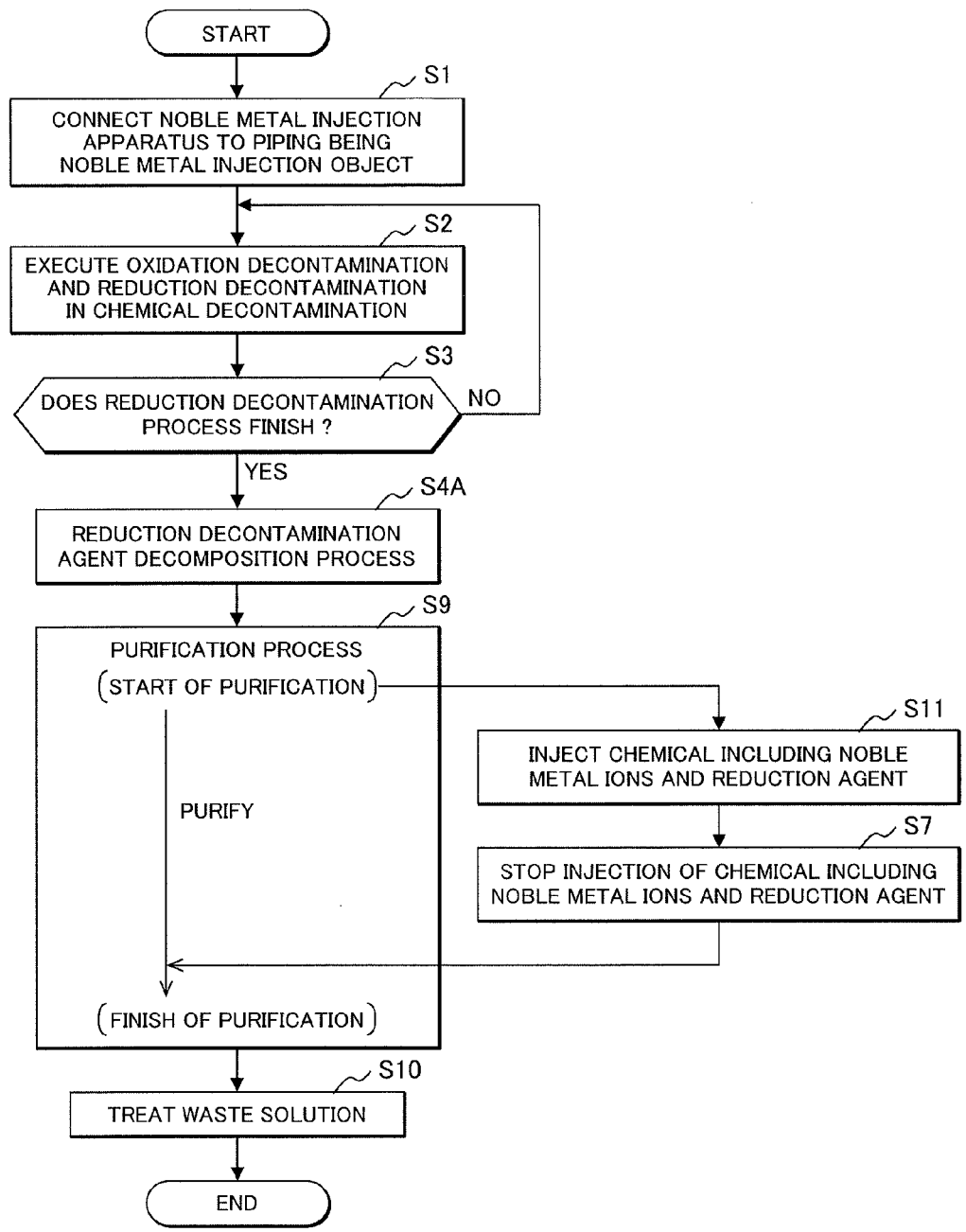
FIG. 16 is a flowchart showing a procedure of a method of depositing a noble metal on a structure member of a nuclear plant according to embodiment 4 which is other embodiment of the present invention, applied to a recirculation pipe of a boiling water nuclear power generation plant.

A method of depositing a noble metal on a structure member of a nuclear plant according to embodiment 4 which is other embodiment of the present invention will be explained by referring to FIGS. 3 and 16. The method of depositing the noble metal on the structure member of the nuclear plant of the present embodiment is applied to the recirculation pipe of the BWR plant.

In the embodiments 1 to 3 described above, the injection of the chemical including platinum ions, and hydrazine which is a reduction agent to the circulation pipe 35 is executed by the reduction decontamination agent decomposition process. On the other hand, in the present embodiment, a procedure shown in FIG. 16 is executed and the injection of the chemical including platinum ions, and hydrazine which is a reduction agent to the circulation pipe 35 is executed in the purification process which is a process of the chemical decontamination. In the present embodiment, the noble metal injection apparatus 30 used in the embodiment 1 is used. The noble metal injection apparatus 30B or the noble metal injection apparatus 30C may be used in place of the noble metal injection apparatus 30.

In the method depositing the noble metal on the structure member of the nuclear plant of the present embodiment, after the operation of the BWR plant is stopped, both ends of the circulation pipe 35 of the noble metal injection apparatus 30 are connected to the recirculation pipe 22 which is a noble metal deposition object similarly to the embodiment 2, at step S1. Furthermore, the oxidation decontamination process, the oxidation decontamination agent decomposition process, and the reduction decontamination process of the chemical decontamination are sequentially executed similarly to the embodiment 2, at step S2 using the noble metal injection apparatus 30. After the decision at Step S3 is "YES" and the reduction decontamination process finished, the oxidation decontamination agent decomposition process of step S4A is executed. The aqueous solution (reduction decontamination solution) including the oxalic acid and hydrazine (pH adjustment agent) discharged from the recirculation pipe 22 to the circulation pipe 35 is supplied to the decomposition apparatus 73 supplying hydrogen peroxide to decompose the oxalic acid and hydrazine (reduction decontamination agent decomposition process). The decomposition of the oxalic acid and hydrazine is executed by circulating the reduction decontamination solution in the closed loop formed by the recirculation pipe 22 and the circulation pipe 35. At step S4A in the present embodiment, the reduction decontamination agent and reduction agent decomposition process (step S4c) which is executed in the embodiment 2 is not executed. Furthermore, at step S4A in the present embodiment, step S11 (injection of the chemical including noble metal ions, and reduction agent) and step S7 (injection stop of the chemical including noble metal ions, and reduction agent) executed in parallel with the decomposition of the reduction decontamination agent in the embodiment 2 are not executed.

After the reduction decontamination agent decomposition process finished, the purification process of step S9 described in the embodiment 2 is executed. In the present embodiment, the injection of the chemical including platinum ions, and hydrazine (step S11) and the injection stop of the chemical including platinum ions, and hydrazine (step S7) are executed sequentially in parallel with the purification process (step S9), and the injection of the chemical including platinum ions to the circulation pipe 35 by the platinum ion injection apparatus 38 and the injection of hydrazine to the circulation pipe 35 by the reduction agent injection apparatus 43 are executed after start of the purification process of step S9, and at this time, the oxalic acid concentration of the aqueous solution into which those chemicals are injected is about 10 ppm. This oxalic acid concentration is the value of the decomposition finish set concentration when the reduction decontamination agent decomposition process of step S4A finishes. The aqueous solution of pH 5.6 at 60° C. including platinum ions, hydrazine, and oxalic acid of 10 ppm is supplied from the circulation pipe 35 to the recirculation pipe 22. In the purification process that this aqueous solution is supplied to the recirculation pipe 22, the valve 64 is opened in the noble metal injection apparatus 30, and the valve 57 is closed, and the valve 70 is opened, and the valve 58 is closed. The valve 67 is closed. By the supply of the aqueous solution at 60° C. including platinum ions and hydrazine to the recirculation pipe 22, the aqueous solution discharged from the recirculation pipe 22 is cooled to 60° C. by the cooler 63, is supplied to the mixed bed resin tower 69 to be purified. The aqueous solution discharged from the mixed bed resin tower 69 is injected with the chemical including platinum ions, and hydrazine and is supplied to the recirculation pipe 22.

Platinum particles are deposited on the inner surface of the recirculation pipe 22 by the supply of the aqueous solution at 60° C. including platinum ions, hydrazine, and oxalic acid to the recirculation pipe 22 and a minute platinum film is formed on the inner surface. After about one hour elapses from the point of time when the supply of the aqueous solution at 60° C. including platinum ions and hydrazine to the recirculation pipe 22 was started, the injection of the chemical including platinum and hydrazine into the circulation pipe 35 is stopped. The aqueous solution including platinum ions, hydrazine, and oxalic acid discharged from the recirculation pipe 22 to the circulation pipe 35 is cooled to 60° C. by the cooler 63 and is supplied to the mixed bed resin tower 69. The platinum ions and hydrazine included in this aqueous solution are removed by the ion exchange resin of the mixed bed resin tower 69. This aqueous solution is purified by the mixed bed resin tower 69. In the purification process, the aqueous solution is purified by circulating in the closed loop including the circulation pipe 35 and the recirculation pipe 22. The oxalic acid included in the aqueous solution is also removed by the mixed bed resin tower 69 and the oxalic acid concentration of the aqueous solution is decreased slowly. The finish of the purification process is decided based on the conductivity measured by the conductivity meter 79. The purification process finishes when, for example, the conductivity becomes 5 μS/cm or lower.

After the purification process finished, the waste solution treatment of step S10 is executed. When the purification process finished, all the processes of the chemical decontamination finish and thereafter, the BWR plant is started.

The present embodiment can shorten the execution time required for the chemical decontamination of the recirculation pipe 22 and the deposition of platinum particles on the inner surface of the recirculation pipe 22. In the present embodiment, in the purification process after finish of the decomposition of the oxalic acid, the chemical including platinum ions, and hydrazine are injected into the oxalic acid aqueous solution including an oxalic acid of 10 ppm, and hydrazine, and oxalic acid, the deposition of platinum on the inner surface of the recirculation pipe 22 is executed by using the aqueous solution including platinum ions, so that the oxalic acid concentration of the aqueous solution is as very low as 10 ppm. Therefore, the deposition quantity of platinum on the inner surface of the recirculation pipe 22 is increased and the time required for platinum deposition on the inner surface of the recirculation pipe 22 is shortened.

Furthermore, the present embodiment can obtain the effects generated in the embodiment 1, that is, (a) platinum particles are efficiently deposited on the inner surface of the recirculation pipe 22 and the deposited platinum particles form a minute film shape on the inner surface, and (b) the surface dose rate of the recirculation pipe 22 is decreased, and (c) the generation of stress corrosion cracking on the structure member of the BWR plant can be suppressed, and (d) the platinum ion concentration of the aqueous solution can be precisely adjusted.

In the present embodiment, the chemical including platinum ions, and hydrazine are injected into the oxalic acid aqueous solution with an oxalic acid concentration of 10 ppm, though it is possible to permit the oxalic acid aqueous solution to circulate in the above-described closed loop by passing through the mixed bed resin tower 69 without injecting these chemicals, and to inject the chemical including platinum ions, and hydrazine into the aqueous solution when the oxalic acid concentration of the oxalic acid aqueous solution is decreased to, for example, 5 ppm. In this case, the aqueous solution including platinum ions, hydrazine, and oxalic acid of 5 ppm is supplied to the recirculation pipe 22. A platinum film is formed on the inner surface of the recirculation pipe 22. After the formation of the platinum film, the injection of the chemical including platinum ions, and hydrazine is stopped and the purification process is executed continuously. As mentioned above, the oxalic acid concentration is decreased more and the chemical including platinum ions, and hydrazine are injected into the oxalic acid aqueous solution, thus the deposited quantity of platinum is increased more, and the time required for the platinum deposition on the inner surface of the recirculation pipe 22 is shortened more.

Embodiment 5

A method of depositing a noble metal on a structure member of a nuclear plant according to embodiment 5 which is other embodiment of the present invention will be explained. The method of depositing the noble metal on the structure member of the nuclear plant of the present embodiment is applied to the recirculation pipe of the BWR plant using the noble metal injection apparatus 30. The noble metal injection apparatus 30B or the noble metal injection apparatus 30C may be used in place of the noble metal injection apparatus 30.

The chemical decontamination executed in embodiments 1 to 4 is executed by using the reduction decontamination solution including oxalic acid and hydrazine (pH adjustment agent) at the reduction decontamination process. In the chemical decontamination, since hydrazine is included, the pH of the reduction decontamination solution is increased slightly due to the addition of hydrazine. For this chemical decontamination, the chemical decontamination for executing the reduction decontamination using a reduction decontamination solution including oxalic acid (reduction decontamination agent) and including no hydrazine (pH adjustment agent) is known.

The method of depositing the noble metal on the structure member of the nuclear plant of the present embodiment is substantially executed based on the procedure shown in FIG. 1. In the present embodiment, the reduction decontamination process in the chemical decontamination of step S2 executed in the embodiment 1 is executed using the aforementioned reduction decontamination solution including the oxalic acid but not including hydrazine. Even if this reduction decontamination process is executed, when it is decided at step S3 that the reduction decontamination process finishes, each process of steps S4 to S10 which are executed in the embodiment 1 is executed. The pH of the reduction decontamination solution used in the reduction decontamination process of the present embodiment becomes smaller than the pH of the reduction decontamination solution used in the embodiment 1 by the amount including no hydrazine.

The present embodiment can obtain each effect generated in the embodiment 1.

The reduction decontamination process using the reduction decontamination solution including oxalic acid but not including hydrazine may be executed in each reduction decontamination process in the embodiment 2 to embodiment 4.

Embodiment 6

Figure 14:
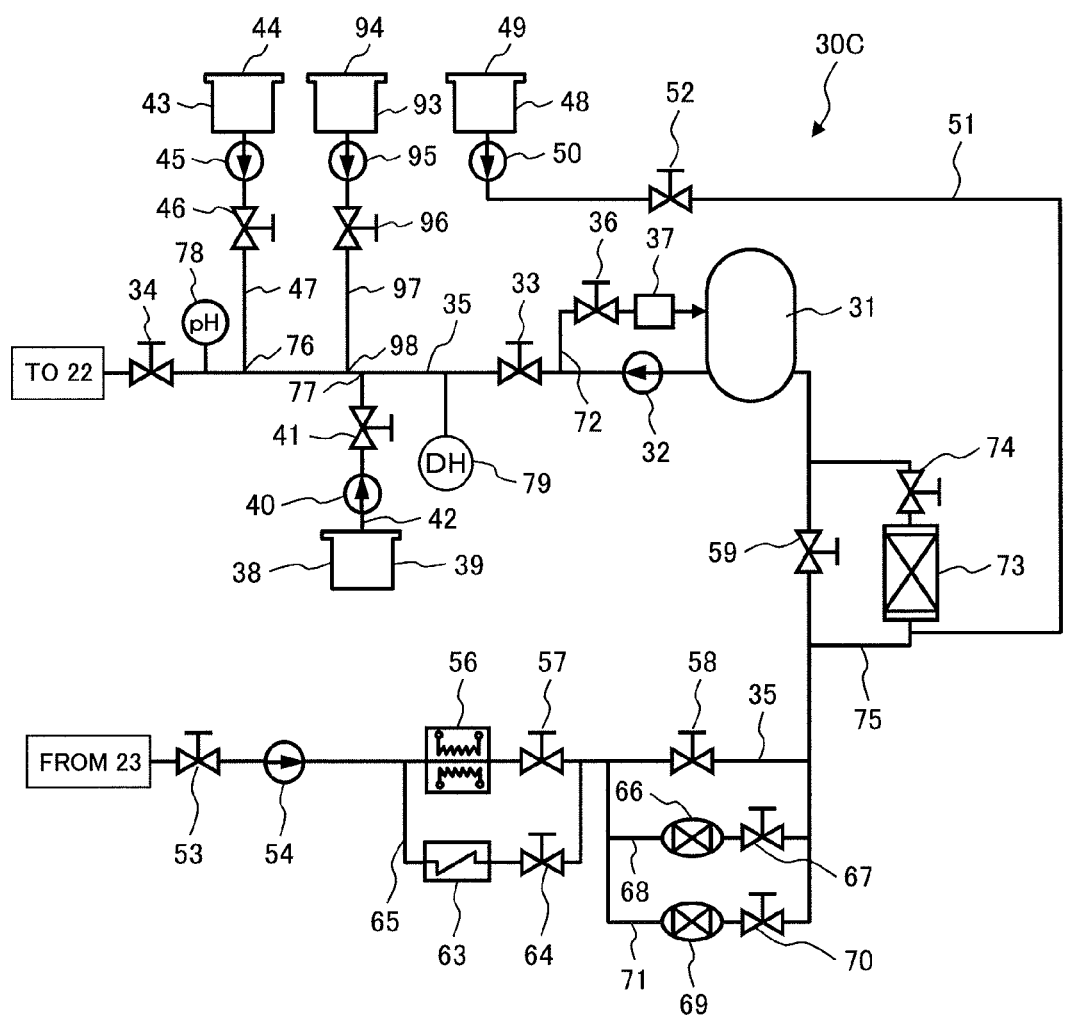
FIG. 14 shows a detailed structural diagram showing a method of depositing a noble metal on a structure member of a nuclear plant according to embodiment 6 which is other embodiment of the present invention, applied to a recirculation pipe of a boiling water nuclear power generation plant

A method of depositing a noble metal on a structure member of a nuclear plant according to embodiment 6 which is other embodiment of the present invention will be explained by referring to FIG. 14. The method of depositing the noble metal on the structure member of the nuclear plant of the present embodiment is applied to the recirculation pipe of the BWR plant.

In the present embodiment, the noble metal injection apparatus 30C is used in place of the noble metal injection apparatus 30 used in the embodiment 1. The noble metal injection apparatus 30C has a structure in which a pH adjustment agent injection apparatus 93 is added to the noble metal injection apparatus 30. The other structures of the noble metal injection apparatus 30C are the same as those of the noble metal injection apparatus 30.

The pH adjustment agent injection apparatus 93 has a bath tank 94, an injection pump 95, and an injection pipe 97. The bath tank 94 is connected to the circulation pipe 35 by the injection pipe 97 including the injection pump 95 and a valve 96. The bath tank 94 is filled with hydrazine which is a pH adjustment agent. The injection pipe 97 is connected to the circulation pipe 35 at a fourth connection point 98 existing between the first connection point 77 and the second connection point 76.

The bath tank 44 of the reduction agent injection apparatus 43 of the noble metal injection apparatus 30C is filled with urea which is a reduction agent. The urea cannot adjust pH, so that the noble metal injection apparatus 30C used in the present embodiment includes the pH adjustment agent injection apparatus 93.

Even in the present embodiment, the procedure shown in FIG. 1, that is, each process of steps S1 to S10 is executed. In the present embodiment, the reduction decontamination process executed at step S2 is different from the reduction decontamination process executed in the embodiment 1. The present embodiment, except the reduction decontamination process, is the same as the embodiment 1.

In the reduction decontamination process of the present embodiment, hydrazine which is a pH adjustment agent in the bath tank 94 is injected into the reduction decontamination solution generated using the oxalic acid supplied from the ejector 37 into the pipe 72 which flows in the circulation pipe 35, thus a reduction decontamination solution of pH 2.5 at a temperature of 90° C. is generated. The reduction decontamination solution is supplied from the circulation pipe 35 to the recirculation pipe 22 and the reduction decontamination of the inner surface of the recirculation pipe 22 is executed.

Thereafter, each process of steps S3 to S5 is executed and the urea which is a reduction agent in the bath tank 44 is injected into the circulation pipe 35 at step S6. The aqueous solution of pH 7 at 90° C. including platinum ions, urea, and oxalic acid is supplied from the circulation pipe 35 to the recirculation pipe 22. The aqueous solution of pH 7 at 90° C. including platinum ions, urea, and oxalic acid makes contact with the inner surface of the recirculation pipe 22 and the platinum ions are reduced by the urea on the inner surface and are deposited on the inner surface of the recirculation pipe 22 as platinum particles. Thereafter, each process of steps S7 to S10 is executed.

After the process of step S10 finished, the circulation pipe 35 of the noble metal injection apparatus 30C is removed from the recirculation pipe 22. Thereafter, the platinum particles are deposited on the inner surface of the recirculation pipe 22 and the BWR plant is started.

The present embodiment can obtain each effect generated in the embodiment 1.

The pH adjustment agent injection apparatus 93 installed on the noble metal injection apparatus 30C may be attached to the noble metal injection apparatus 30A.

Further, the pH adjustment agent injection apparatus 93 may be added to the noble metal injection apparatus 30B used in the embodiment 3 similarly to the embodiment 6. The injection pipe 97 of the pH adjustment agent injection apparatus 93 is connected to the circulation pipe 35 between the first connection point 77 and the second connection point 76 in the noble metal injection apparatus 30B.

Embodiment 7

Figure 15:
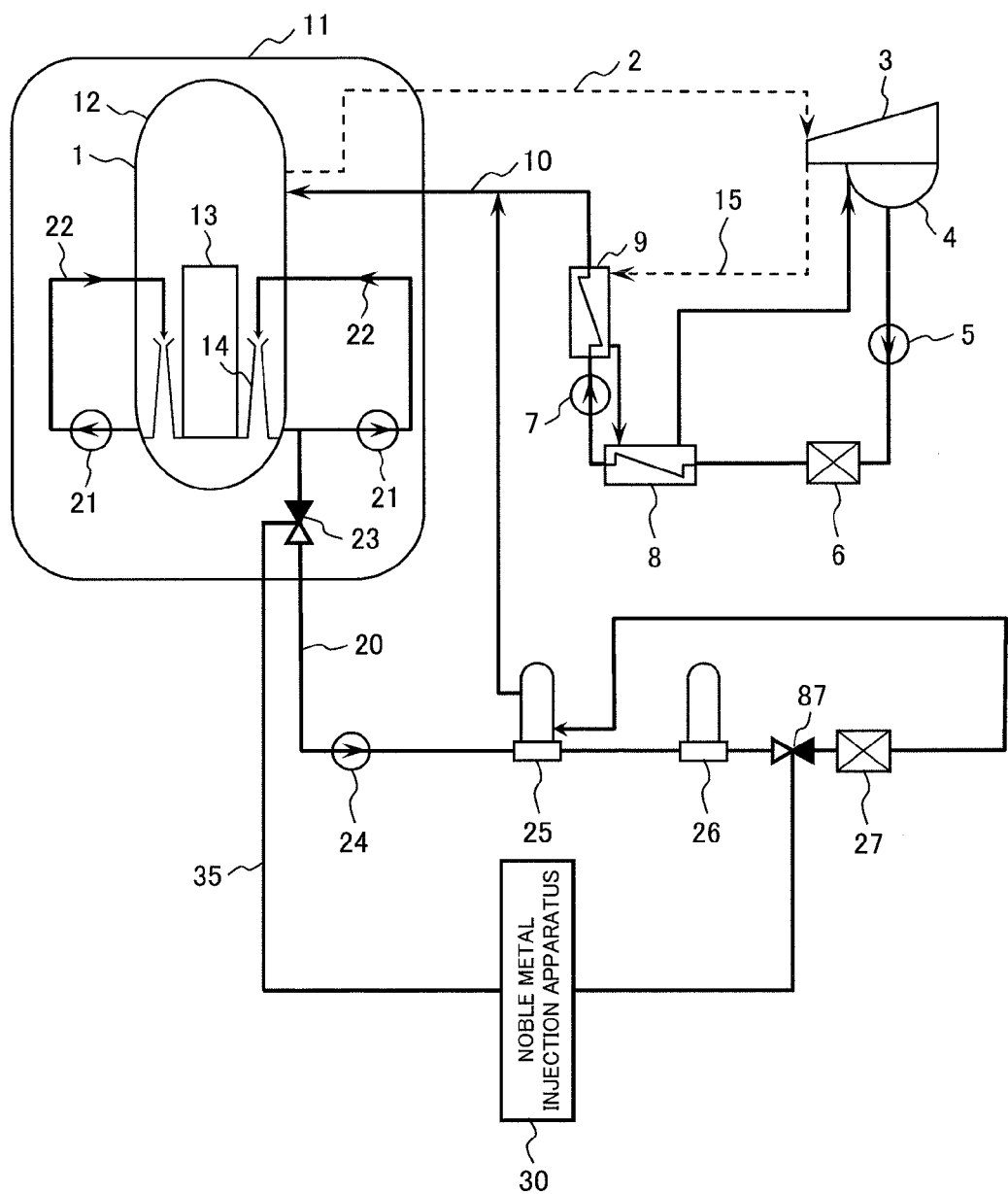
FIG. 15 is an explanatory drawing showing a state that a noble metal injection apparatus used in a method of depositing a noble metal on a structure member of a nuclear plant according to embodiment 7 which is other embodiment of the present invention is connected to a purification system pipe of a boiling water nuclear power generation plant.

A method of depositing a noble metal on a structure member of a nuclear plant according to embodiment 7 which is other embodiment of the present invention will be explained below by referring to FIG. 15. The method of depositing the noble metal on the structure member of the nuclear plant of the present embodiment is applied to the purification system pipe 20 of the BWR plant.

In the present embodiment, the noble metal injection apparatus 30 used in the embodiment 1 is used. Any of the noble metal injection apparatuses 30A to 30D may be used in place of the noble metal injection apparatus 30. In the present embodiment, the procedure including each process of steps S1 to S10 shown in FIG. 1 is executed similarly to the embodiment 1.

In step S1 of the present embodiment, one end of the circulation pipe 35 of the noble metal injection apparatus 30 is connected to the flange of the valve 23 similarly to the embodiment 1. The other end of the circulation pipe 35 of the noble metal injection apparatus 30 is connected to the flange of the opened bonnet of the valve 87 installed on the purification system pipe 20 between the non-regeneration heat exchanger 26 and the reactor water purification apparatus 27. In this way, the noble metal injection apparatus 30 is connected to the purification system pipe 20 and a closed loop is formed by the purification system pipe 20 and the circulation pipe 35.

After both ends of the circulation pipe 35 of the noble metal injection apparatus 30 are connected to the purification system pipe 20, each process of steps S2 to S10 is executed similarly to the embodiment 1. Therefore, the chemical decontamination of the inner surface of the purification system pipe 20 between the valve 23 and the valve 87 is executed and the deposition of platinum particles on the inner surface of the purification system pipe 20 between the valve 23 and the valve 87 is executed.

After the process of step S10 finished, the circulation pipe 35 of the noble metal injection apparatus 30D is removed from the recirculation pipe 22. Thereafter, the BWR plant with platinum particles deposited on the inner surface of the recirculation pipe 22 is started.

The present embodiment can obtain each effect generated in the embodiment 1.

The method of depositing the noble metal on the structure member of the nuclear plant of any of embodiment 1 to embodiment 7 can be applied to the pipes installed on the reactor pressure vessel of the pressurized water nuclear power generation plant.

Embodiment 8

Figure 17:
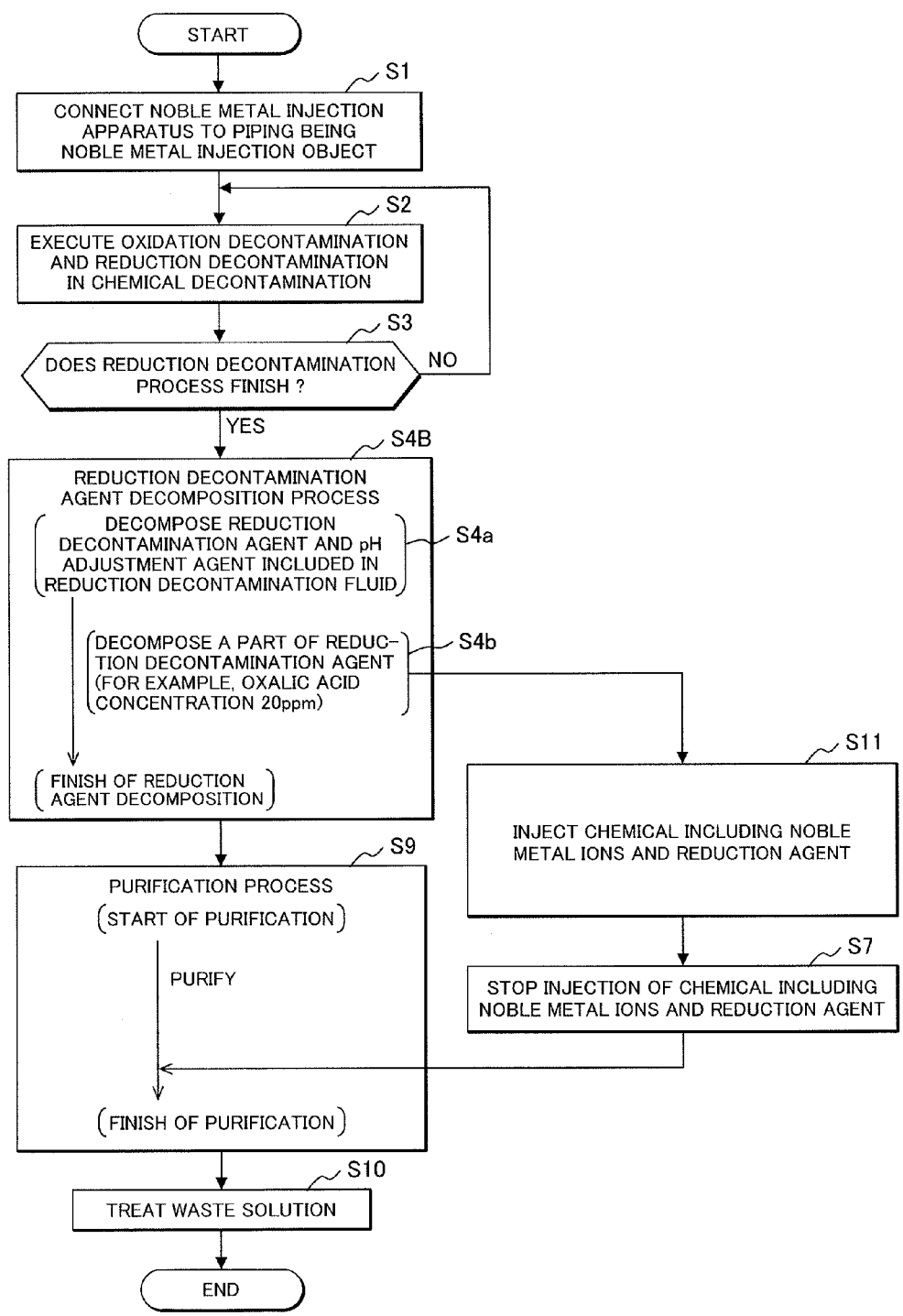
FIG. 17 is a flowchart showing a procedure of a method of depositing a noble metal on a structure member of a nuclear plant according to embodiment 8 which is other embodiment of the present invention, applied to a recirculation pipe of a boiling water nuclear power generation plant.

A method of depositing a noble metal on a structure member of a nuclear plant according to embodiment 8 which is other embodiment of the present invention will be explained by referring to FIGS. 17 and 3. The method of depositing the noble metal on the structure member of the nuclear plant of the present embodiment is applied to the recirculation pipe of the BWR plant.

The method of depositing the noble metal on the structure member of the nuclear plant of the present embodiment is executed in such a way that in the method depositing the noble metal on the structure member of the nuclear plant of the embodiment 2, the reduction decontamination agent decomposition process of step S4A is changed to a reduction decontamination agent decomposition process of step S4B, and the process of step S11 (the injection process of the chemical including noble metal ions, and the reduction agent) is executed in parallel with the process of step S4B and the process of step S9 (the purification process), and the process of Step S7 (the injection stop process of the chemical including noble metal ions, and the reduction agent) is executed when the process of step S9 (the purification process) is executed. Each of the other processes of the procedure of the method of depositing the noble metal on the structure member of the nuclear plant of the present embodiment is the same as each process of the procedure of the method of depositing the noble metal on the structure member of the nuclear plant of the embodiment 2. In the present embodiment, the noble metal injection apparatus 30 used in the embodiment 1 is used. Either of the noble metal injection apparatus 30B used in the embodiment 3 and the noble metal injection apparatus 30C used in the embodiment 6 may be used in place of the noble metal injection apparatus 30.

The method of depositing the noble metal on the structure member of the nuclear plant of the present embodiment will be explained centering on the different process from the method of depositing the noble metal on the structure member of the nuclear plant of the embodiment 2.

Both ends of the circulation pipe 35 of the noble metal injection apparatus 30 are connected to the recirculation pipe 22 of the BWR plant similarly to the embodiment 2 at step S1. Steps S2 and S3 are executed and thereafter, step S4B is executed.

The reduction decontamination agent decomposition process is executed (step S4B). The reduction decontamination agent decomposition process includes the reduction decontamination agent and pH adjustment agent decomposition process (step S4a). In step S4a, the decomposition of the oxalic acid and hydrazine included in the reduction decontamination solution is executed similarly to step S4 in the embodiment 1 by the decomposition apparatus 73 to which hydrogen peroxide is supplied. A part of the oxalic acid included in the reduction decontamination solution (the oxalic acid aqueous solution) is decomposed (step S4b).

When a part of the reduction decontamination agent included in the reduction decontamination solution is decomposed, the chemical including noble metal ions, and the reduction agent are injected (step S11). At step S4a, when a part of the oxalic acid is decomposed and the oxalic acid concentration of the oxalic acid aqueous solution is decreased down to 20 ppm, the chemical including platinum ions is injected similarly to step S11 of the embodiment 2 from the bath tank 39 into the circulation pipe 35. In the present embodiment, when the oxalic acid concentration of the oxalic acid aqueous solution became 20 ppm, the injection of the chemical including platinum ions is executed, so that the injection start of the chemical including platinum ions in the present embodiment gets late compared with the embodiment 2, where the injection of the chemical including platinum ions is started when the oxalic acid concentration is decreased to 50 ppm due to the decomposition of the oxalic acid of the oxalic acid aqueous solution. The platinum ion concentration of the aqueous solution of the chemical (first chemical) including platinum ions injected into the circulation pipe 35 is 400 ppt. By this injection of the aqueous solution of the chemical including platinum ions, the platinum ion concentration of the aqueous solution including oxalic acid of 20 ppm flowing in the circulation pipe 35 becomes 100 ppt.

Thereafter, when the aqueous solution including platinum ions and oxalic acid reaches the second connection point described above, the hydrazine which is a reduction agent in the bath tank 44 is injected into the aqueous solution including platinum ions (concentration: 100 ppt) flowing in the circulation pipe 35 and oxalic acid. By the injection of hydrazine, the pH of the aqueous solution becomes 7. The aqueous solution of pH 7 at 90° C. including platinum ions (concentration: 100 ppt), hydrazine, and oxalic acid is supplied from the circulation pipe 35 to the recirculation pipe 22. The platinum ions are reduced by the hydrazine on the inner surface of the recirculation pipe 22 and are deposited on the inner surface as platinum particles.

While the injection of the chemical including platinum ions, and hydrazine which is a reduction agent into the circulation pipe 35 at step S11 is executed, the supply of the aqueous solution including platinum ions and oxalic acid which is returned from the recirculation pipe 22 to the circulation pipe 35 to the decomposition apparatus 73 is executed continuously. Therefore, the decomposition of the oxalic acid is executed continuously in the decomposition apparatus 73. When the oxalic acid concentration of the aqueous solution including platinum ions and oxalic acid became 10 ppm, the reduction decontamination agent decomposition process (step S4B) finishes. Thereafter, the purification process (step S9) is executed similarly to the embodiment 1.

The injection of the chemical including platinum ions, and hydrazine at step S11 is continued, for example, for about one hour from the injection start thereof. The injection of the chemical including platinum ions, and hydrazine is executed for about one hour, so that platinum particles are deposited on the inner surface of the recirculation pipe 22 and a minute platinum film can be formed on the inner surface. This injection of the chemical including platinum ions, and hydrazine is executed even after the purification process of step S9 is started.

When about one hour elapses from the injection start of the chemical including platinum ions, and hydrazine to the circulation pipe 35, the injection of the chemical including platinum ions, and hydrazine is stopped (step S7). The injection stop of the chemical including platinum ions, and hydrazine is performed when the purification process (step S9) is in operation.

After the injection stop of the chemical including platinum ions, and hydrazine, the injection of platinum ions and hydrazine into the aqueous solution flowing in the circulation pipe 35 is stopped, so that the platinum ions and hydrazine in the aqueous solution are removed by the mixed bed resin tower 69 and the conductivity of the aqueous solution is decreased with the progress of the purification process. When the conductivity of the aqueous solution is decreased to, for example, 5 μS/cm or lower, the purification process (step S9) finishes and the waste solution treatment (step S10) is executed.

After the process of step S10 finished, the circulation pipe 35 of the noble metal injection apparatus 30 is removed from the recirculation pipe 22. Thereafter, the BWR plant with platinum particles deposited on the inner surface of the recirculation pipe 22 is started.

The present embodiment can obtain each effect generated in the embodiment 2. In the present embodiment, while the aqueous solution including platinum ions, hydrazine, and oxalic acid is supplied to the recirculation pipe 22, the aqueous solution including the oxalic acid discharged from the recirculation pipe is supplied to the decomposition apparatus 73 and the oxalic acid can be decomposed. Therefore, in the present embodiment, the time required for the decomposition of the oxalic acid, that is, the reduction decontamination agent can be shortened more than that in the embodiment 1. Further, the changing period from the reduction agent decomposition process to the purification process and the beginning of the purification process can be used for the platinum deposition process, so that the platinum deposition work period can be shortened.

REFERENCE SIGNS LIST

12: reactor pressure vessel, 20: purification system pipe, 22: recirculation pipe, 30, 30B, 30C: noble metal injection apparatus, 31: surge tank, 32, 54: circulation pump, 35: circulation pipe, 37: ejector, 38: platinum ion injection apparatus, 40, 45, 50, 95: injection pump, 39, 44, 49, 94: bath tank, 43: reduction agent injection apparatus, 48: oxidizing agent supply apparatus, 56: heater, 63: cooler, 66: cation exchange resin tower, 69: mixed bed resin tower, 73: decomposition apparatus, 78, 80: pH meter, 82: quartz crystal microbalance apparatus, 85: crystal, 86: metallic member, 88: seal member, 93: pH adjustment agent injection apparatus.

What is claimed is:

1. A method of depositing a noble metal on a structure member of a nuclear plant, comprising:
   1) executing reduction decontamination of a surface of a structure member of a nuclear plant in contact with reactor water by using a first aqueous solution including a reduction decontamination agent; and
   2) bringing a second aqueous solution including noble metal ions, a reduction agent, and said reduction decontamination agent into contact with said surface of said structure member on which said reduction decontamination is executed and depositing said noble metal on said surface;
   wherein said second aqueous solution is generated by injecting chemical including said noble metal ions and said reduction agent into said first aqueous solution,
   wherein step 2 is performed in a period that at least part of said reduction decontamination agent from step 1 remains in said second aqueous solution and has not been decomposed,
   wherein steps 1 and 2 are executed after operation stop of said nuclear plant but before start of said nuclear plant, and
   wherein the noble metal is selected from the group consisting of platinum, palladium, rhodium, ruthenium, osmium, and iridium.

2. The method of depositing a noble metal on a structure member of a nuclear plant according to claim 1, comprising:
   decomposing said reduction decontamination agent and said reduction agent included in said second aqueous solution after said second aqueous solution is brought into contact with said surface at said second step.

3. The method of depositing a noble metal on a structure member of a nuclear plant according to claim 2, further comprising:
   adjusting the pH of said second aqueous solution including said noble metal ions, said reduction agent, and said reduction decontamination agent within a range from 3.5 to 9.0 by injecting said reduction agent prior to said second step.

4. The method of depositing a noble metal on a structure member of a nuclear plant according to claim 2, further comprising:
adjusting the temperature of said second aqueous solution including said noble metal ions, said reduction agent, and said reduction decontamination agent to within a range from 60° C. to 100° C. prior to said second step.

5. The method of depositing a noble metal on a structure member of a nuclear plant according to claim 2, wherein the reduction decontamination agent and the reduction agent is decomposed using a catalyst and an oxidizing agent.

6. The method of depositing a noble metal on a structure member of a nuclear plant according to claim 1, further comprising:
3) supplying said second aqueous solution to a resin tower filled with cation exchange resin and anion exchange resin after said noble metal is deposited on said surface; and
4) purifying said second aqueous solution in said resin tower.

7. The method of depositing a noble metal on a structure member of a nuclear plant according to claim 1, wherein said first aqueous solution comprises said reduction decontamination agent and a pH adjustment agent.

8. The method of depositing a noble metal on a structure member of a nuclear plant according to claim 7, wherein the reduction agent is hydrazine or the pH adjustment agent is ammonia.

9. A method of depositing a noble metal on a structure member of a nuclear plant, comprising:
1) supplying a first aqueous solution including a reduction decontamination agent to a first pipe and executing reduction decontamination of an inner surface of said first pipe by using said first aqueous solution,
wherein the first pipe is said structure member of said nuclear plant connected to a reactor pressure vessel through a second pipe; and
2) supplying a second aqueous solution including noble metal ions, a reduction agent, and said reduction decontamination agent, to said first pipe through said second pipe,
wherein the second aqueous solution is generated by injecting chemical including said noble metal ions and said reduction agent into said first aqueous solution including said reduction decontamination agent, 3) bringing said second aqueous solution into contact with said inner surface of said first pipe and depositing said noble metal on said surface, in a period that at least part of said reduction decontamination agent from step 1 remains in said second aqueous solution and has not been decomposed;
wherein steps 1, 2, and 3 are executed after operation stop of said nuclear plant but before start of said nuclear plant, and
wherein the noble metal is selected from the group consisting of platinum, palladium, rhodium, ruthenium, osmium, and iridium.

10. The method of depositing a noble metal on a structure member of a nuclear plant according to claim 9, further comprising:
forming a closed loop by using said first pipe and said second pipe.

11. The method of depositing a noble metal on a structure member of a nuclear plant according to claim 9, further comprising:
4) discharging said second aqueous solution from said first pipe after said second aqueous solution is brought into contact with said surface at said second step and decomposing said reduction decontamination agent and said reduction agent included in said second aqueous solution.

12. The method of depositing a noble metal on a structure member of a nuclear plant according to claim 11, wherein the reduction decontamination agent and the reduction agent is decomposed using a catalyst and an oxidizing agent.

13. The method of depositing a noble metal on a structure member of a nuclear plant according to claim 9, comprising:
adjusting the pH of said second aqueous solution including said noble metal ions, said reduction agent, and said reduction decontamination agent within a range from 3.5 to 9.0 by injecting said reduction agent prior to said second step.

14. The method of depositing a noble metal on a structure member of a nuclear plant according to claim 9, comprising:
adjusting the temperature of said second aqueous solution including said noble metal ions, said reduction agent, and said reduction decontamination agent to within a range from 60° C. to 100° C. prior to said second step.

15. The method of depositing a noble metal on a structure member of a nuclear plant according to claim 9, wherein the reduction decontamination agent is decomposed by using a catalyst and an oxidizing agent.

* * * * *